(12) United States Patent
Takeuchi et al.

(10) Patent No.: US 8,240,863 B2
(45) Date of Patent: Aug. 14, 2012

(54) ILLUMINANT DEVICE

(75) Inventors: Hideto Takeuchi, Osaka (JP); Kouichi Fujiwara, Osaka (JP); Akira Toyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 322 days.

(21) Appl. No.: 12/664,152

(22) PCT Filed: May 29, 2008

(86) PCT No.: PCT/JP2008/059907
§ 371 (c)(1),
(2), (4) Date: Dec. 11, 2009

(87) PCT Pub. No.: WO2008/152920
PCT Pub. Date: Dec. 18, 2008

(65) Prior Publication Data
US 2010/0172154 A1      Jul. 8, 2010

(51) Int. Cl.
*G09F 13/04*      (2006.01)
*G09F 13/08*      (2006.01)

(52) U.S. Cl. ............. 362/97.1; 362/217.13; 362/217.17; 362/633; 349/58

(58) Field of Classification Search ........ 362/97.1–97.4, 362/217.1–217.17, 632–633; 349/58
See application file for complete search history.

(56) References Cited

U.S. PATENT DOCUMENTS

| | | |
|---|---|---|
| 2001/0050735 A1 | 12/2001 | Yajima et al. |
| 2005/0168954 A1 | 8/2005 | Kim |
| 2006/0098136 A1 | 5/2006 | Masunaga et al. |
| 2006/0109616 A1 | 5/2006 | Lee et al. |
| 2006/0133017 A1 | 6/2006 | Bang |
| 2007/0229731 A1 | 10/2007 | Lan et al. |

FOREIGN PATENT DOCUMENTS

| | | |
|---|---|---|
| EP | 1 655 705 | 5/2006 |
| JP | 34-19633 | 12/1959 |
| JP | 2000-342475 A | 12/2000 |
| JP | 2001-25878 A | 1/2001 |
| JP | 2001-337611 | 12/2001 |
| JP | 2002-5129 A | 1/2002 |
| JP | 2002-6755 A | 1/2002 |
| JP | 2002-123178 A | 4/2002 |
| JP | 2003-61215 A | 2/2003 |
| JP | 2003-273536 A | 9/2003 |
| JP | 2005-56882 A | 3/2005 |
| JP | 2005-71687 A | 3/2005 |
| JP | 2005-196210 A | 7/2005 |
| JP | 2006-201318 A | 8/2005 |
| JP | 2006-337776 A | 12/2006 |
| RU | 2 020 378 C1 | 9/1994 |
| RU | 2 143 083 C1 | 12/1999 |
| WO | WO 96/25622 A1 | 8/1996 |

*Primary Examiner* — Jason Moon Han
(74) *Attorney, Agent, or Firm* — Birch, Stewart, Kolasch & Birch, LLP

(57) ABSTRACT

In a chassis which has a lid plate closing an opening portion of a frame part and in which a plurality of lamps are juxtaposed, the lid plate includes a plurality of plate bodies juxtaposed with their end parts superposed on each other and a connecting unit connects the superposed end parts of the plate bodies and the superposed end parts of the plate bodies, respectively.

6 Claims, 30 Drawing Sheets

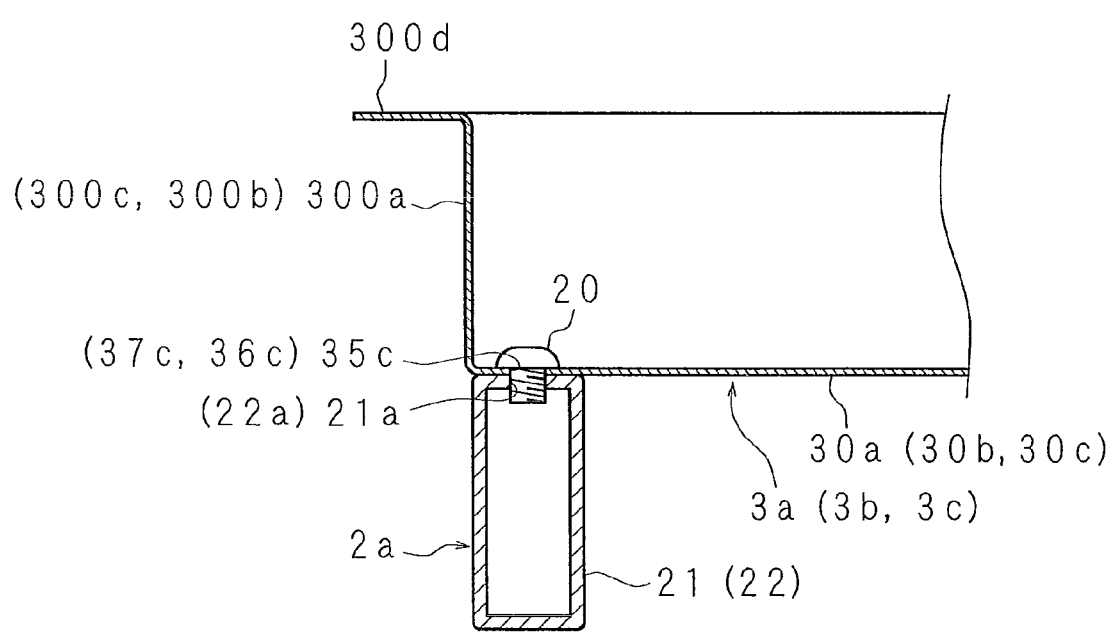
F I G. 26

ILLUMINANT DEVICE

This application is the national phase under 35 U.S.C. §371 of PCT International Application No. PCT/JP2008/059907 which has an International filing date of May 29, 2008 and designated the United States of America.

BACKGROUND

1. Technical Field

The present invention relates to an illuminant device to be used as a light source of a display device such as a liquid crystal display device.

2. Description of Related Art

In the display device such as a television, an illuminant device is arranged behind a display unit having a display surface which displays an image on a front side thereof.

The illuminant device comprises, for example, a plurality of lamps having electrodes in both end parts thereof, and a chassis which includes a frame part having a rectangular parallelepiped shape, a lid plate closing an opening portion of the frame part, and a plurality of reinforcement crosspieces mounted to the lid plate with a distance therebetween, and in the chassis, said lamps are juxtaposed (for example, refer to Japanese Patent Application Laid-Open No. 2006-337776). The lid plate has a rectangular shape corresponding to the frame part, consists of a metal plate such as an aluminum plate and an iron plate, and has a peripheral portion joined to the frame part.

Moreover, the following is a known configuration of a chassis in an illuminant device. The chassis has two rectangular cylindrical bodies which have screw insertion holes in peripheral surfaces of end parts thereof and are arranged in parallel with a distance therebetween, and two connecting members which are molded by die-casting so as to have approximately an open square bracket and have convex pieces to be fitted in said two rectangular cylindrical bodies in both ends thereof, and by fitting the convex pieces of the respective connecting members into both end parts of the respective rectangular cylindrical bodies, and screwing male screws inserted into said screw insertion holes into screw holes perforated in said convex pieces, a frame body having a rectangular parallelepiped shape is formed, and a peripheral portion of a lid plate consisting of a metal plate is mounted on the frame body with a plurality of male screws (for example, refer to Japanese Patent Application Laid-Open No. 2002-6755).

SUMMARY

By the way, in a thin display device such as a liquid crystal television, a panel thereof becomes larger every year and the illuminant device also becomes larger in response to the increase in the size of the panel.

However, since the lid plate of the chassis in the illuminant device is formed from a metal plate and the lid plate is formed by a die, a super-sized die for forming a lid-plate is required for an illuminant device to be used for a comparatively large-sized display device, the cost regarding manufacturing efficiency of the lid plate and a lid-plate manufacturing equipment increases, the manufacturing cost of the lid plate and accordingly, the cost of the illuminant device increase, and hence improvement is required. Moreover, there is a problem that the lid plate expands thermally with heat generated by the lamp etc. and a curve, deflection and deformation occur in said lid plate easily.

In view of such a problem, the applicant of the present invention has previously developed an illuminant device by constructing a lid plate of said chassis from a plurality of plate bodies juxtaposed along a surface of said lid plate, and connecting members connecting adjacent plate bodies, thereby improving the productivity of the lid plate, reducing the cost of the comparatively large-sized illuminant device, and preventing deflection and deformation by thermal expansion of the lid plate.

However, in the illuminant device, since end parts of the adjacent plate bodies oppose to each other, and the connecting members connect the end parts of the adjacent plate bodies in this state, it is likely to generate a clearance between the end parts of the adjacent plate bodies, outside dust might enter the chassis from the clearance between said end parts, and further improvement is required.

As for a chassis having a frame body formed from one sheet of metal plate and a lid plate consisting of one sheet of metal plate, the frame body and the lid plate can be simply formed. However, since the thin display device is enlarged increasingly in recent years, and the illuminant device to be used for the thin display device is also enlarged increasingly, the frame body formed from a metal plate is generally easy to twist and deform.

Moreover, as described in Japanese Patent Application Laid-Open No. 2002-6755, in the chassis where the lid plate consisting of a metal plate is mounted on the frame body which is formed in a quadrangular shape from a pair of rectangular cylindrical bodies and a pair of connecting members molded so as to have approximately an open square bracket shape, the super-sized die for forming a lid-plate is required, the cost regarding the manufacturing efficiency of the lid plate and the lid-plate manufacturing equipment increases, the manufacturing cost of the lid plate and accordingly, the cost of the chassis and the cost of the illuminant device increase, and when a defect occurs in a part of the lid plate, repair of the defect portion is difficult and the entire lid plate needs to be exchanged, and thus, improvement is required.

The present invention has been made in view of these circumstances, and a main object thereof is to provide an illuminant device capable of preventing outside dust from entering a chassis from a clearance between end parts of a plurality of juxtaposed plate bodies, and from a clearance between end parts of a plurality of juxtaposed chassis components, and capable of improving a connecting strength of the end parts.

Moreover, another object is to provide, by constructing a chassis from a frame body formed of a plurality of frame components connected in a quadrangular shape and a plurality of plate bodies mounted in juxtaposition on said frame body, an illuminant device that permits formation of the chassis by a comparatively small die with better productivity even if the illuminant device is comparatively large-sized, increase in a strength of a comparatively large-sized chassis, and also improvement in the yield.

An illuminant device according to the present invention is an illuminant device comprising a chassis which has a frame part and a lid plate closing an opening portion of said frame part and in which a plurality of lamps are arranged, characterized in that said lid plate includes a plurality of juxtaposed plate bodies whose end parts are superposed on each other.

In this invention, the end parts of the juxtaposed plate bodies are superposed on each other, and thereby preventing outside dust from entering the chassis from a clearance between the end parts of the plate bodies.

An illuminant device according to the present invention is an illuminant device comprising a chassis in which a plurality of lamps are arranged, characterized in that said chassis includes a plurality of juxtaposed chassis components whose end parts are superposed on each other.

In this invention, the end parts of the juxtaposed chassis components are superposed on each other, and thereby preventing outside dust from entering the chassis from a clearance between the end parts of the chassis components.

An illuminant device according to the present invention is preferred to further comprise a connecting unit connecting said superposed end parts to each other.

In this invention, the end parts of the plurality of plate bodies or the plurality of chassis components are superposed on and connected to each other, and thereby improving the connection strength of the plate bodies, and accordingly, the rigidity of the chassis without using a reinforcing member.

An illuminant device according to the present invention is preferred to be constructed such that one of the superposed end parts is displaced in a direction in which the end parts are superposed.

In this invention, a direction in which outside dust enters the chassis can be changed to two directions, and thereby improving the prevention of dust-entering. Moreover, there is no step between the adjacent end parts inside the chassis, and an inner surface of the chassis can be made flat.

An illuminant device according to the present invention is preferred to be constructed such that the connecting unit has a strip-shaped plate which is bent in a concavo-convex shape in a direction of thickness thereof, and a mounting member for mounting the strip-shaped plate on the superposed end parts.

In this invention, since the strip-shaped plate presses the superposed end parts in the superposed direction, the superposed end parts can be tightly attached to each other on the whole simply, and even if the chassis is comparatively large-sized, the number of said mounting member can be reduced, and thereby improving processability and assembling workability of the chassis.

An illuminant device according to the present invention is preferred to be constructed such that one of said superposed end parts has a cylinder part which projects in a direction in which the end parts are superposed, and is arranged in a concave portion of said strip-shaped plate, said strip-shaped plate has a through hole which penetrates the concave portion, and said mounting member is inserted into the through hole and is fitted in said cylinder part.

In this invention, since the fitting amount of the mounting member increases without causing the mounting member project in the chassis, the flatness in the chassis can be maintained, the connection strength can be improved by the fitting of the mounting member, and accordingly the rigidity of the chassis can be further improved.

An illuminant device according to the present invention is preferred to be constructed such that said superposed end parts have concave parts, respectively, and the concave parts are fitted in each other.

In this invention, the concave parts are provided in the superposed end parts themselves and the concave parts are fitted in each other, and thereby the connection strength of the plate bodies or the chassis components, and accordingly the rigidity of the chassis are improved, without use of a reinforcing member and strip-shaped plate.

An illuminant device according to the present invention is preferred to be constructed such that through holes penetrating said concave parts are provided and a connecting unit is fitted in said through holes.

In this invention, since the fitting amount of the connecting unit increases without causing the connecting unit such as a male screw to project in the chassis, the flatness in the chassis can be maintained, the connection strength can be improved by the connecting unit, and accordingly the rigidity of the chassis can be improved.

An illuminant device according to the present invention is preferred to be constructed such that one of said superposed end parts has a concave part and a through hole penetrating the concave part, and the other of said superposed end parts has a cylinder part which projects in a direction in which the end parts are superposed, and is arranged in said concave part, and said connecting unit is inserted into said through hole and is fitted in said cylinder part.

In this invention, since the fitting amount of the connecting unit increases without causing the connecting unit such as a male screw to project in the chassis, the flatness in the chassis can be maintained, the connection strength can be improved by the connecting unit, and accordingly the rigidity of the chassis can be improved.

An illuminant device according to the present invention is an illuminant device comprising a chassis in which a plurality of lamps are arranged, characterized in that said chassis includes a frame body which has a plurality of frame components connected in a quadrangular shape, and a plurality of plate bodies which are mounted in juxtaposition on said frame body.

In this invention, even if the illuminant device is comparatively large-sized, the chassis having the frame body and the plate bodies can be formed by a comparatively small die with better productivity, and since the plurality of plate bodies are mounted in juxtaposition on the frame body having the plurality of frame components connected in the quadrangular shape, a strength of the comparatively large-sized chassis can be increased. Moreover, even if a defect occurs in one or some of the plate bodies, it is possible to obtain a chassis by exchanging only the plate body where the defect has occurred, and thereby to improve the yield.

An illuminant device according to the present invention is preferred to be constructed such that opposing edge portions of the adjacent plate bodies are arranged apart from connecting parts of said frame components in a circumferential direction of said frame body.

In this invention, since the connecting parts of the frame body where the plurality of frame components are connected in a quadrangular shape, and the opposing edge portions of the adjacent plate bodies are disposed with a distance therebetween in the circumferential direction of the frame body, the torsion rigidity of the chassis can be improved with a simple structure, and even if the illuminant device is comparatively large-sized, the cost of the illuminant device provided with the chassis having high rigidity can be reduced.

An illuminant device according to the present invention is preferred to be constructed such that said plate bodies have plate parts and rising pieces which rise from non-opposing edges of the adjacent plate parts, respectively, and said plate bodies are mounted on said frame body so that said rising piece form a frame shape.

In this invention, since the rising pieces of the plate bodies form a frame shape, by said rising pieces and the frame body where the plurality of frame components are connected in the quadrangular shape, the torsion rigidity of the chassis can be further improved, and even if the illuminant device is comparatively large-sized, the cost of the illuminant device provided with the chassis having high rigidity can be reduced.

An illuminant device according to the present invention is preferred to be constructed such that said frame components are cylindrical bodies arranged on four sides of said frame body, and in corner portions of the four sides, one of the two adjacent cylindrical bodies has a fitting hole in a peripheral surface which opposes an end of the other cylindrical body, whereas the other cylindrical body has a fitting shaft extending outward beyond the end and fitted in said fitting hole, and further, the illuminant device further comprising escape preventing means for preventing the fitting shaft from escaping from said fitting hole.

In this invention, since the two cylindrical bodies are connected so as to cross at right angles by the fitting of the fitting shaft of one cylindrical body in the fitting hole of the other cylindrical body, the frame body of the comparatively large-sized chassis can be constructed in a highly accurate quadrangular shape simply. Furthermore, since the connecting state of the two cylindrical bodies is maintained by the escape preventing means, even if the illuminant device is comparatively large-sized, the cost of the illuminant device provided with the chassis having high rigidity can be reduced.

An illuminant device according to the present invention is preferred to be constructed such that said frame body is arranged outside said rising pieces.

In this invention, since the whole of the juxtaposed plate bodies can be made smaller than the frame body, the plate bodies can be formed by a smaller die with better productivity.

An illuminant device according to the present invention is preferred to be constructed such that said frame body is arranged inside said rising pieces.

In this invention, since the optical sheet for diffusing light emitted by the lamps can be supported by the frame body and the frame body serves as a sheet receiving base for supporting the optical sheet, a dedicated sheet receiving base can be removed.

An illuminant device according to the present invention is preferred to be constructed such that said frame body is arranged outside said plate parts.

In this invention, since a recess space can be created inside the frame body, a substrate such as an inverter substrate to be connected to the lamps can be mounted on the frame body apart from the plate body, the structure for mounting the substrate can be simplified, and the workability for mounting the substrate can be improved.

According to the present invention, the end parts of the juxtaposed plate bodies are superposed on each other, and thereby outside dust can be prevented from entering the chassis from a clearance between the end parts of the plate bodies.

According to the present invention, the end parts of the juxtaposed chassis components are superposed on each other, and thereby outside dust can be prevented from entering the chassis from a clearance between the end parts of the chassis components.

According to the present invention, the end parts of the plate bodies or the end parts of the chassis components are superposed on and connected to each other, and thereby the connection strength of the plate bodies and accordingly, the rigidity of the chassis can be improved, without use of a reinforcing member.

According to the present invention, even if the illuminant device is comparatively large-sized, the chassis having the frame body and the plate bodies can be formed by a comparatively small die with better productivity. Furthermore, since the plurality of plate bodies are mounted in juxtaposition on the frame body where the plurality of frame components are connected in the quadrangular shape, the intensity of the comparatively large-sized chassis can be increased. Moreover, even if a defect occurs in one or some of the plate bodies, it is possible to obtain a chassis by exchanging only the plate body where the defect has occurred, and thereby to improve the yield.

The above and further objects and features will more fully be apparent from the following detailed description with accompanying drawings.

BRIEF DESCRIPTION OF THE DRAWINGS

FIG. 26 is a sectional view showing the configuration of Embodiment 7 of the chassis of the illuminant device according to the present invention;

DETAILED DESCRIPTION

In the following, the present invention is explained in detail based on drawings showing embodiments thereof.

Embodiment 1

Figure 1:
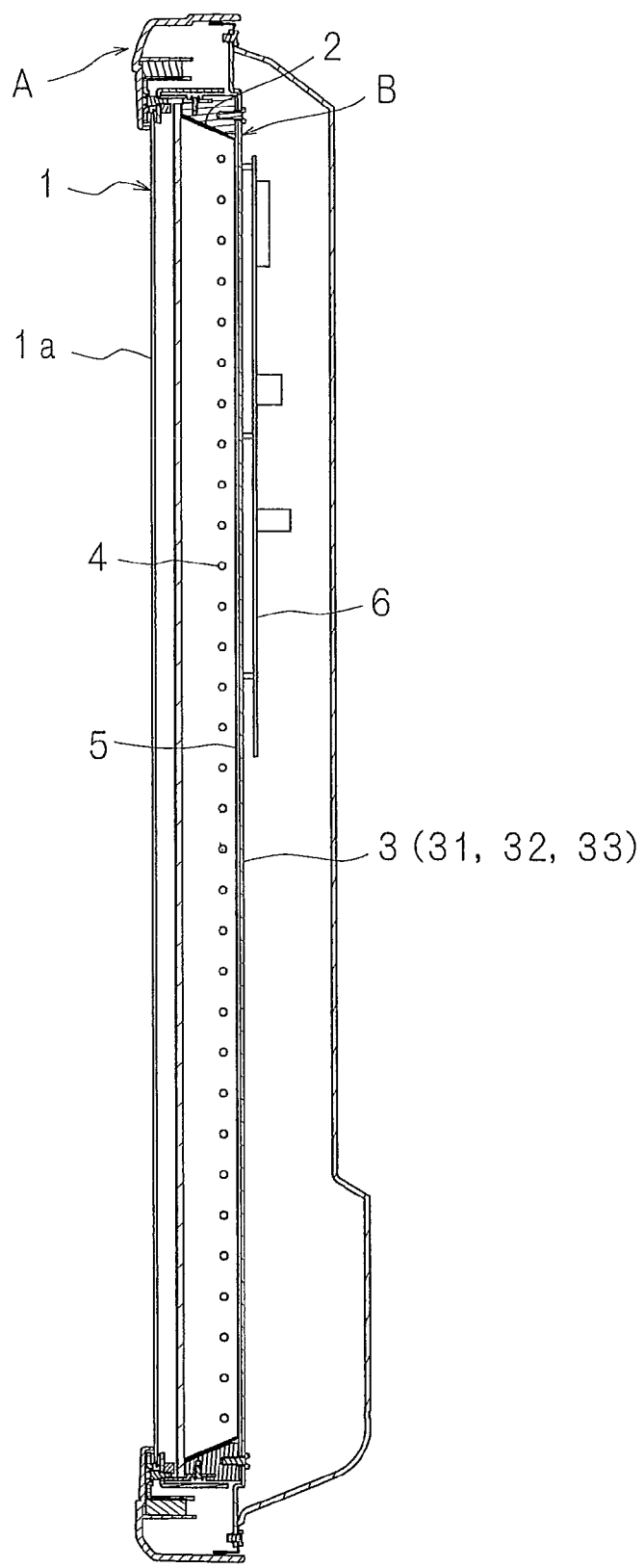
FIG. 1 is a sectional view showing a configuration of an illuminant device according to the present invention incorporated in a display device.
Figure 2:
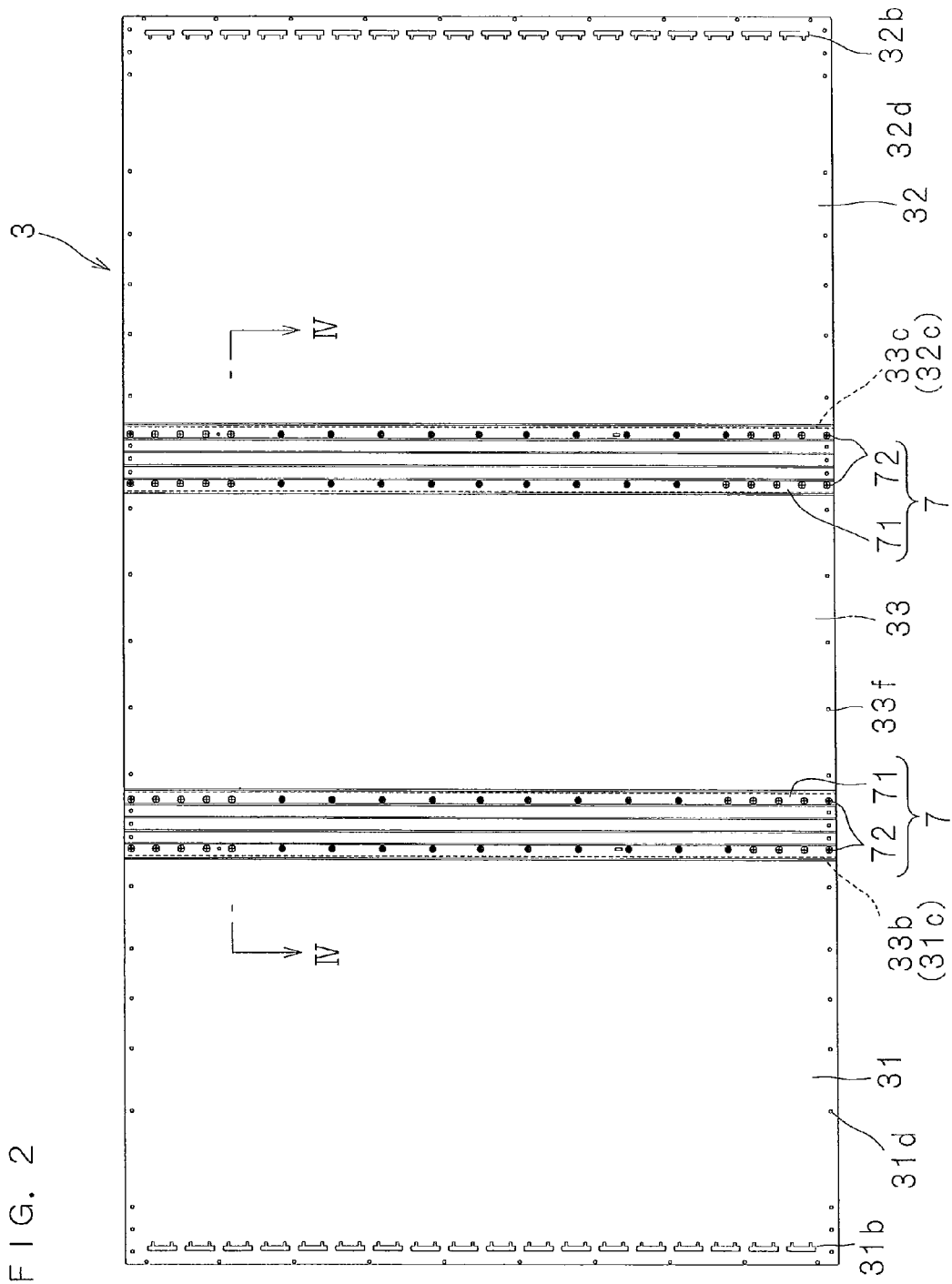
FIG. 2 is a rear view showing a configuration of a chassis of the illuminant device according to the present invention.
Figure 3:
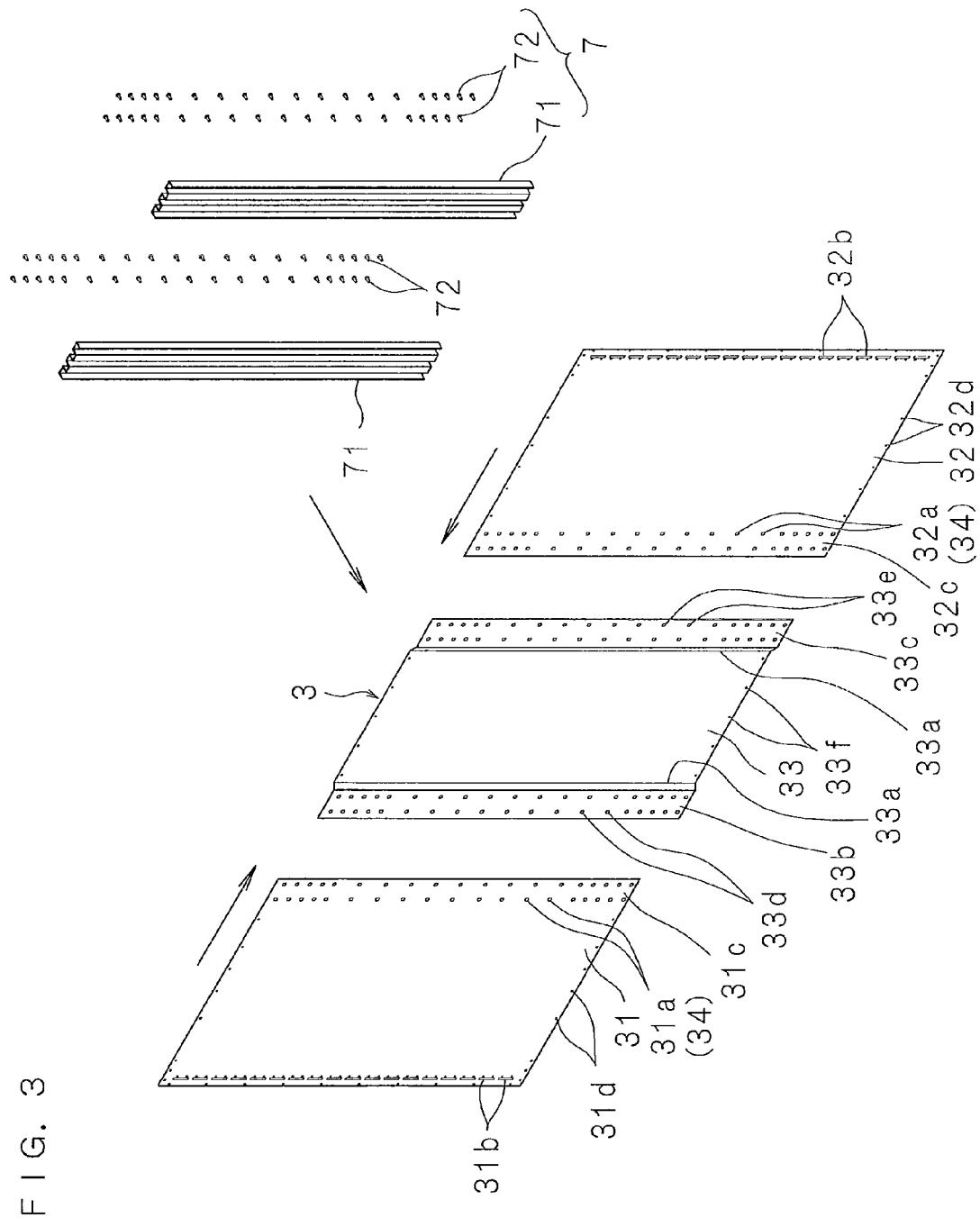
FIG. 3 is an exploded perspective view showing the configuration of the chassis of the illuminant device according to the present invention where a frame part is omitted.
Figure 4:
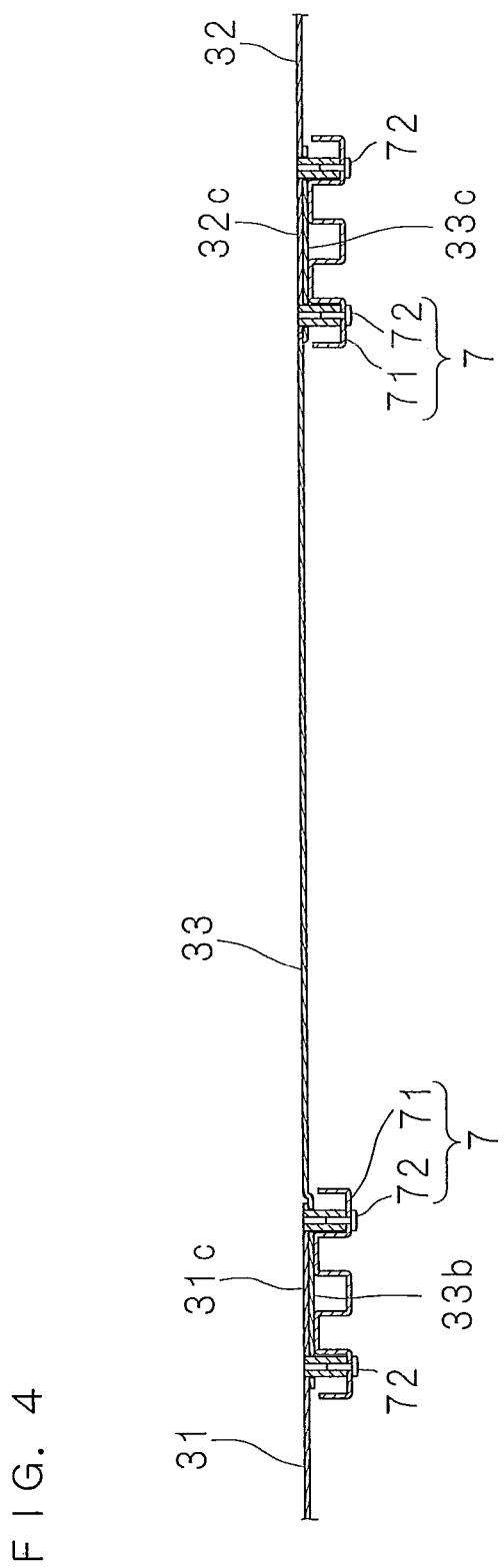
FIG. 4 is an enlarged sectional view taken along line IV-IV in FIG. 2.
Figure 5:
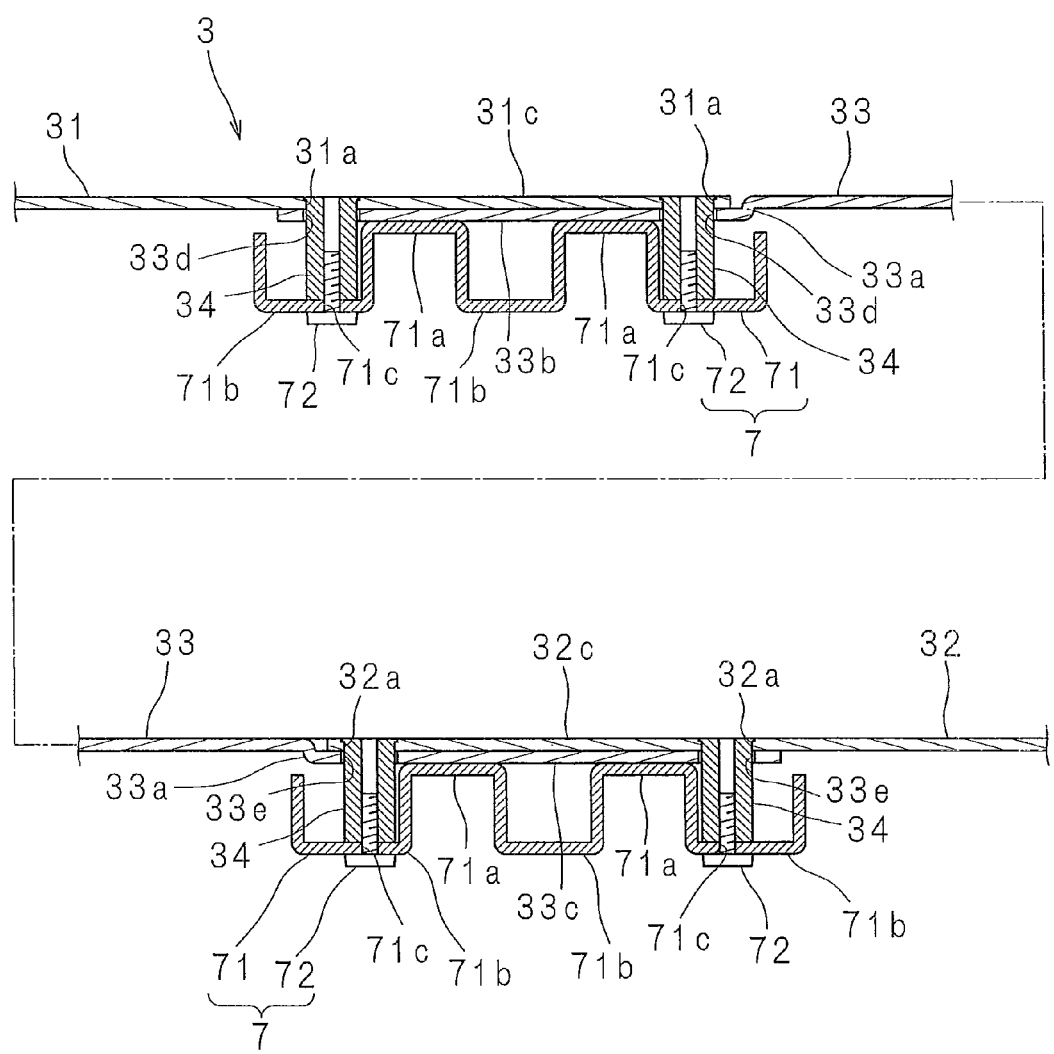
FIG. 5 is an enlarged sectional view where a part of the line IV-IV in FIG. 2 is omitted.

FIG. 1 is a sectional view showing a configuration of an illuminant device according to the present invention incorporated in a display device, FIG. 2 is a rear view showing a configuration of a chassis of an illuminant device according to the present invention, FIG. 3 is an exploded perspective view showing a configuration of the chassis in which a frame part is omitted, FIG. 4 is an enlarged sectional view taken along line IV-IV in FIG. 2, and FIG. 5 is an enlarged sectional view where a part of the line IV-IV in FIG. 2 is omitted.

The illustrated illuminant device is mounted behind a display unit 1 in a thin display device A provided with the display unit 1 having a display surface 1a on a front side thereof and an approximately rectangular parallelepiped shape. The illuminant device comprises a chassis B having a frame part 2 and a lid plate 3 and having a box shape with a front side thereof opened, a plurality of lamps 4 which have straight tubular shapes and are juxtaposed with a distance therebetween up and down in the chassis B, a holder holding both end parts of said lamps 4 inside the frame part, a plurality of clips holding intermediate parts of said lamps 4 with respect to the lid plate 3, a reflective sheet 5 which is arranged in the chassis B and reflects light emitted by the lamps 4 to an opening portion side of the chassis B, and an electrical component 6 such as an inverter circuit substrate which is mounted on an outer face of the lid plate 3.

The lamps 4 are cold cathode tubes or hot cathode tubes having electrodes in both end parts thereof, and the inverter circuit substrate is connected to the electrode of each lamp 4 so that a luminosity thereof is controlled by a pulse width modulation signal.

The chassis B includes the frame part 2 having a rectangular parallelepiped shape, and the lid plate 3 having a peripheral portion joined to the frame part 2 and closing a back side end of the frame part 2. A plurality of screw holes are perforated in the back side end of the frame part 2 with a distance therebetween in a circumferential direction thereof. The lid plate 3 is constructed with first to third plate bodies 31, 32, 33 which are juxtaposed along a face of said lid plate 3 in a longitudinal direction of the lamps 4 and connect by a connecting unit 7, and is formed in a rectangular shape corresponding to the frame part 2. The first to third plate bodies 31, 32, 33 are constructed by forming an aluminum plate in an approximately rectangular shape, and adjacent end parts thereof are superposed on each other.

In one end part of each of the first and second plate bodies 31, 32, a plurality of mounting holes 31a, 32a having annular recesses around edges thereof are perforated with a distance therebetween in a direction in which the plate bodies 31 to 33 are juxtaposed and a direction along ends of said end parts, cylindrical bodies 34 having screw holes are mounted in the mounting holes 31a, 32a, respectively. After the cylindrical bodies 34 are fitted in the mounting holes 31a, 32a, one ends thereof are fixed by caulking and caulked parts are fitted in said annular recesses. Moreover, insertion holes 31b, 32b for connectors to be connected to the lamps 4 and the inverter circuit substrate are provided in a row in the other end part of each of the first and second plate bodies 31, 32.

Both end parts of the third plate body 33 are displaced through shoulders 33a, 33a in a plate thickness direction (superposed direction), an end part 31c of the first plate body 31 is superposed on the one end part 33b, and an end part 32c of the second plate body 32 is superposed on the other end part 33c. In the one end part 33b, insertion holes 33d where the cylindrical bodies 34 of the first plate body 31 are inserted, respectively, are perforated with a distance therebetween in the juxtaposition direction of the plate bodies 31 to 33 and a direction along an end of the one end part 33b. In the other end part 33c, insertion holes 33e where the cylindrical bodies 34 of the second plate body 32 are inserted, respectively, are perforated with a distance therebetween in the juxtaposition direction of the plate bodies 31 to 33 and a direction along an end of the other end part 33c.

Moreover, insertion holes 31d, 32d, 33f corresponding to the screw holes are perforated in ends of the first to third plate bodies 31, 32, 33 corresponding to the frame part 2.

The connecting unit 7 has strip-shaped plates 71 which are superposed on the end parts 33b, 33c of the third plate body 33 and are bent in a concavo-convex shape in a cross section in a direction of the width thereof and in a direction of the thickness thereof, and male screws 72 which are screwed into screw holes of the cylindrical bodies 34 and push and mount the strip-shaped plates 71 on the superposed end parts 31c, 33b, 32c, 33c. Here, the male screws 72 constitute a mounting member.

Each of the strip-shaped plates 71 is bent in a concavo-convex shape with two contact flat surfaces 71a in contact with outer faces of the end parts 33b, 33c and three concave parts 71b which are depressed from edges on both sides of each of the contact flat surfaces 71a, and the two concave parts 71b located on both sides include through holes 71c corresponding to the cylindrical bodies 34 perforated in said superposed direction. Each of the through holes 71c has a diameter smaller than that of each cylindrical body 34, and a tip of each cylindrical body 34 is in contact with an inner face of each concave part 71b.

The connection of the first to third plate bodies 31, 32, 33 are provided by juxtaposing the first and second plate bodies 31, 32 having the end parts 31c, 32c where the cylindrical bodies 34 are mounted, with a distance therebetween along the surface of lid plate 3 so that outer faces thereof face upward, arranging the third plate body 33 between the first and second plate bodies 31, 32, inserting the cylindrical bodies 34 of the first plate body 31 into the insertion holes 33d of the one end part 33b of the third plate body 33, inserting the cylindrical bodies 34 of the second plate body 32 into the insertion holes 33e of the other end part 33c of the third plate body 33, then laying the strip-shaped plates 71 on the end parts 33b, 33c of the third plate body 33, and in a condition that the contact flat surfaces 71a of said strip-shaped plates 71 are in contact with the outer faces of the end parts 33b, 33c, inserting the male screws 72 into the through holes 71c perforated in the concave parts 71b of the strip-shaped plates 71, and screwing the male screws into the screw holes of the cylindrical bodies 34. The connecting causes the contact flat surfaces 71a of strip-shaped plates 71 to push against the end parts 33b, 33c, causes the superposed end parts 31c, 33b and the superposed end parts 32c, 33c to tightly attach to each other, and removes a clearance between the superposed end parts 31c, 33b and a clearance between the superposed end parts 32c, 33c. The lid plate 3 formed in this manner is laid on the back end of the frame part 2, and is mounted on the frame part 2 with the male screws which are inserted into the insertion holes 31d, 32d, 33f of the first to third plate bodies 31 to 33 and screwed into the screw holes, and thereby the chassis B having a box shape is formed.

In the chassis B of the illuminant device constituted as mentioned above, the contact flat surfaces 71a of the strip-shaped plates 71 connecting the first to third plate bodies 31 to 33 are pushed against the end parts 33b, 33c, the superposed end parts 31c, 33b and the superposed end parts 32c, 33c are tightly attached to each other, and a clearance between the superposed end parts 31c, 33b and a clearance between the superposed end parts 32c, 33c are removed. Moreover, since the end parts 33b, 33c of the third plate body 33 are displaced in the superposed direction and the end parts 31c, 32c of the first and second plate bodies 31, 32 are superposed on the displaced end parts 33b, 33c, a direction in which outside dust enters the chassis B becomes two directions, i.e., said juxtaposition direction and said superposed direction, the prevention of dust-entering can be improved. Moreover, since an inner face of the chassis B can be made flat, generation of wrinkles of the reflective sheet 5 arranged inside the chassis B can be prevented.

Moreover, in the lid plate 3, since the end parts 31c, 32c of the first and second plate bodies 31, 32 consisting of aluminum plates are superposed on and connected to the end parts 33b, 33c of the third plate body 33 consisting of a aluminum plate by the strip-shaped plates 71 and male screws 72, the weight saving of the lid plate 3 can be achieved, the rigidity of the lid plate 3 can be improved, the weight saving of the chassis B can be achieved even if the illuminant device is comparatively large-sized, and also the rigidity of the chassis B can be improved.

Therefore, when the thermal expansion amount in a longitudinal direction of the lid plate 3 composed of the first to third plate bodies 31, 32, 33 connected to each other by the connecting unit 7, and the thermal expansion amount in a longitudinal direction of a lid plate consisting of one sheet of aluminum plate are measured at the initial temperature of 20° C., the temperature of 40° C. at the time of analysis, and hence a temperature difference of 20° C., the thermal expansion amount of the lid plate 3 composed of the connected first to third plate bodies 31, 32, 33 is 0.687 mm, whereas the thermal expansion amount of the lid plate consisting of one sheet of aluminum plate is 0.701 mm, and thus, the thermal expansion amount can be reduced.

Embodiment 2

Figure 6:
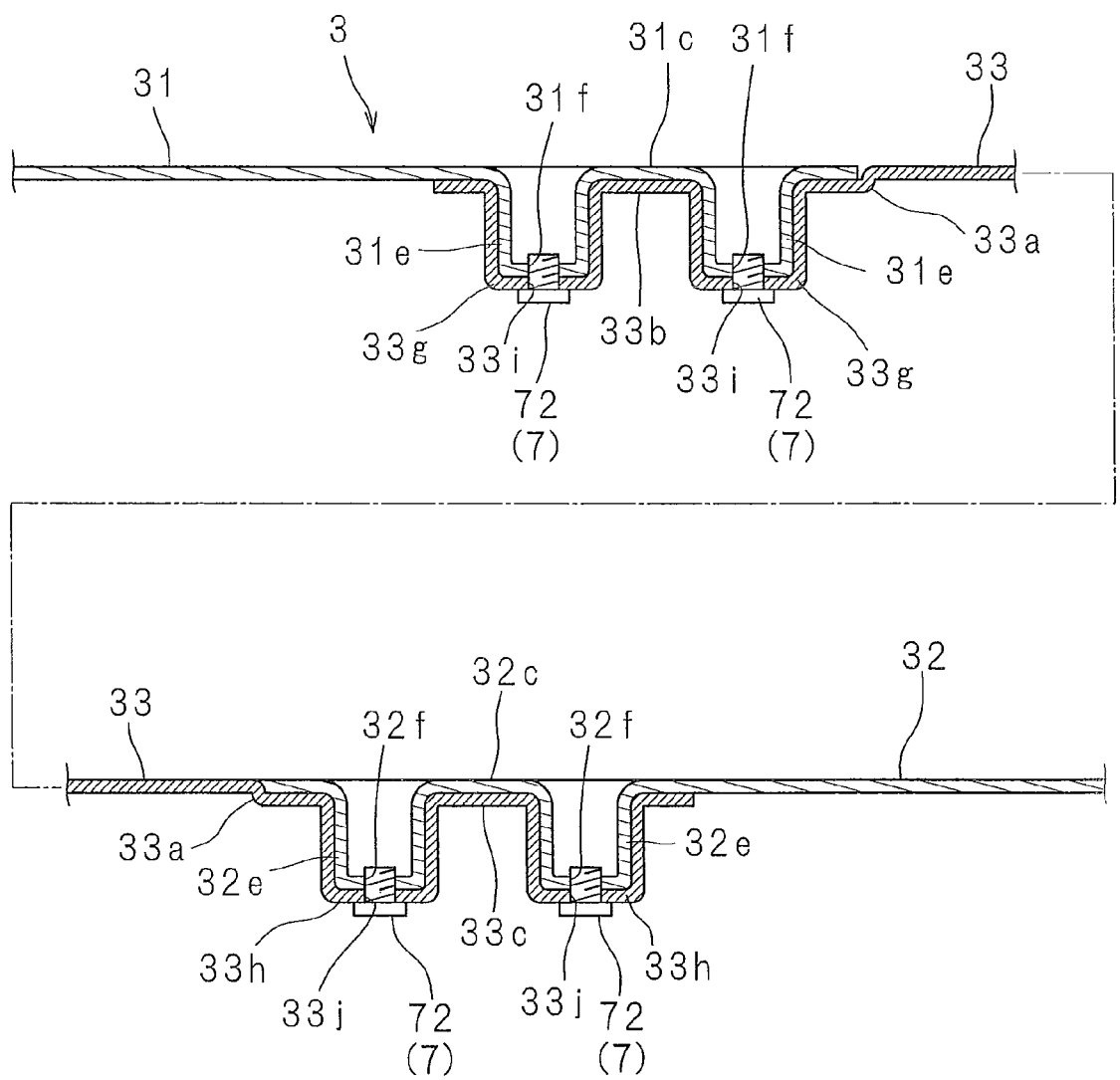
FIG. 6 is an enlarged sectional view showing a main part in another configuration of the chassis of the illuminant device according to the present invention.
Figure 7:
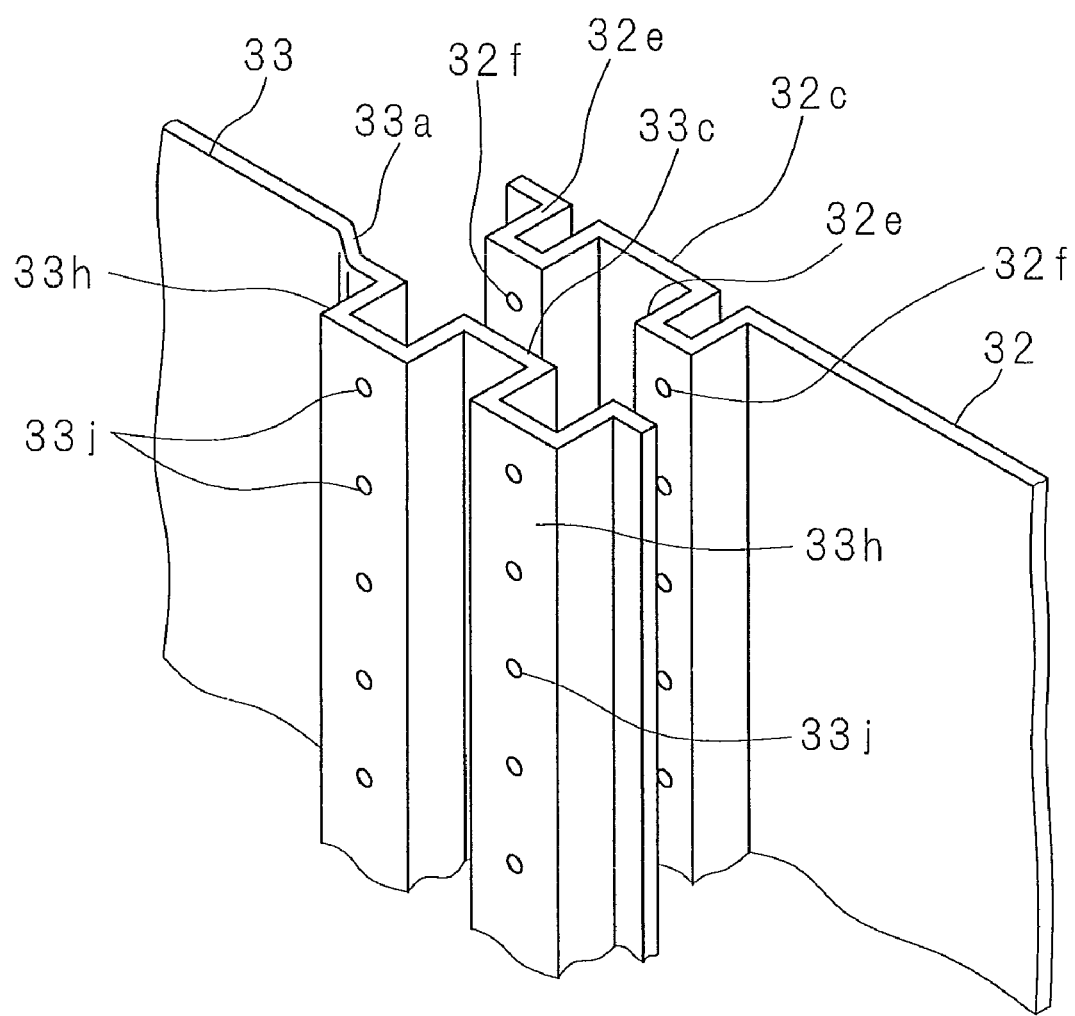
FIG. 7 is an exploded enlarged perspective view showing an main part in another configuration of the chassis of the illuminant device according to the present invention.

FIG. 6 is an enlarged sectional view showing a main part in another configuration of the chassis of the illuminant device, and FIG. 7 is an exploded enlarged perspective view showing a main part in another configuration of the chassis. In the illuminant device, instead of using the connecting unit 7 having the strip-shaped plates 71 like Embodiment 1, concave parts 31e, 33g which are depressed in the superposed direction are provided in the superposed end parts 31c, 33c of the first and third plate bodies 31, 33, at a plurality of positions disposed with a distance therebetween in the direction in which the plate bodies 31 to 33 are juxtaposed, concave parts 32e, 33h which are depressed in the superposed direction are provided in the superposed end parts 32c, 33c of the second and third plate bodies 32, 33, at a plurality of positions disposed with a distance therebetween in the direction in which the plate bodies 31 to 33 are juxtaposed, through holes 31f, 33i, 32f, 33j penetrating in said superposed direction are perforated in the concave parts 31e, 33g, 32e, 33h, respectively, and the male screws 72 are screwed into said through holes 31f, 33i, 32f, 33j, thereby the superposed end parts 31c, 33b and the superposed end parts 32c, 33c are connected to each other, respectively. In addition, screw holes are provided in the through holes 31f, 32f perforated in the concave parts 31e, 32e of the first and second plate bodies 31, 32.

In the illuminant device, by the superposition of the end parts 33b, 33c of the third plate body 33 on the end parts 31c, 32c of the first and second plate bodies 31, 32 juxtaposed with a distance therebetween, the concave parts 31e, 33g of the superposed end parts 31c, 33b are fitted in each other, and the concave part 32e, 33h of the superposed end parts 32c, 33c are fitted in each other. Thereafter, the male screws 72 are inserted into the through holes 33i, 33j of the concave parts 33g, 33h of the third plate body 33, and are screwed into the through holes 31f, 32f of the concave parts 31e, 32e of the first and second plate bodies 31, 32, and thereby the superposed end parts 31c, 33b and the superposed end parts 32c, 33c are connected to each other, respectively. Thus, since the male screws 72 constitute the connecting unit 7 without the strip-shaped plates 71, the assembling workability of the chassis B can be improved. Moreover, since the concave parts 31e, 33g, 32e, 33h are provided in the superposed end parts 31c, 33b and the superposed end parts 32c, 33c, respectively, and the concave part 31e is fitted in the concave part 33g and the concave part 32e is fitted in the concave part 33h, respectively, the closer contact between the superposed end parts 31c, 33b and between the superposed end parts 32c, 33c, in other words, improved prevention of dust-entering can be achieved and the connecting strength can be improved without using the strip-shaped plates 71.

Since the other structures and functions are the same as those in Embodiment 1, the same codes are used to refer to the same parts and the detailed description thereof is omitted.

Embodiment 3

Figure 8:
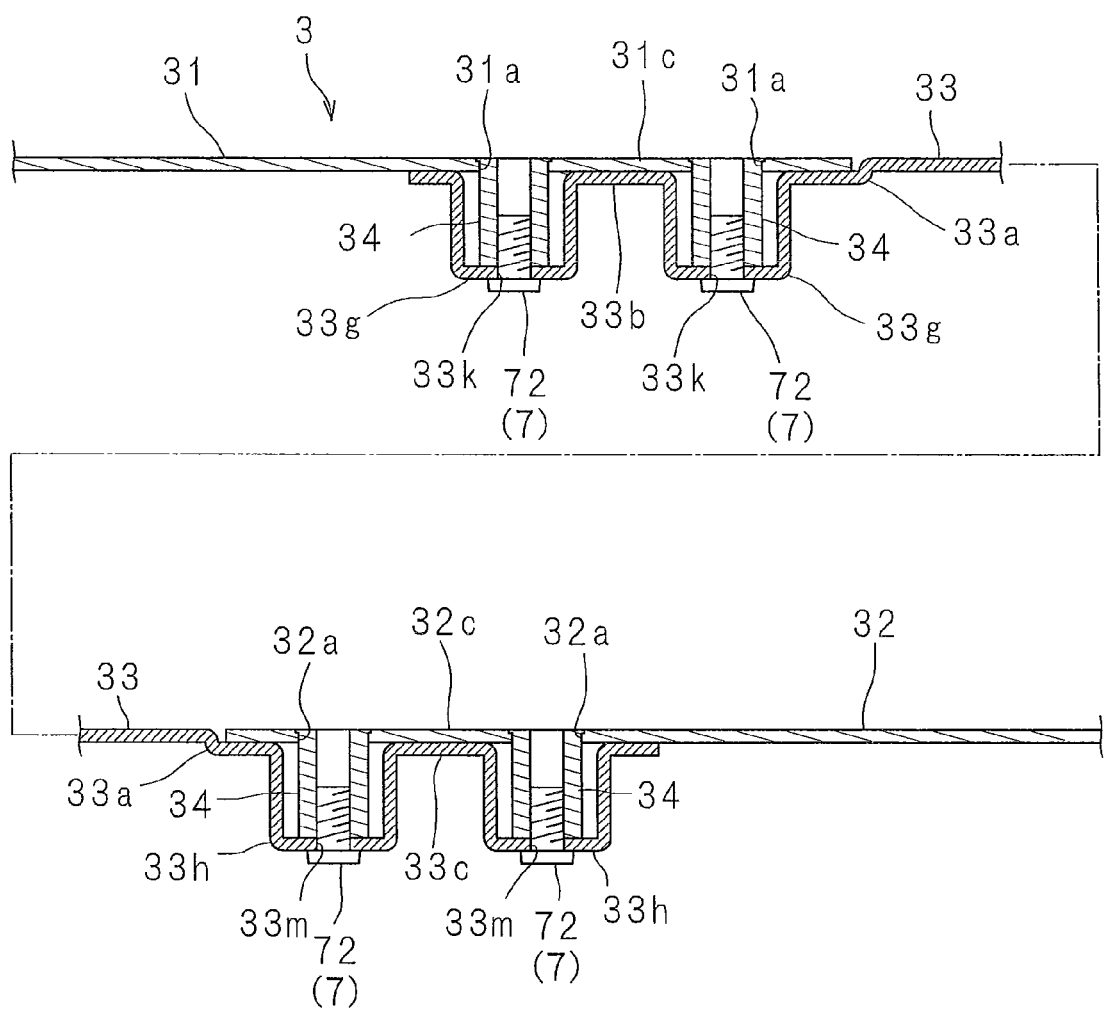
FIG. 8 is an enlarged sectional view showing a main part in another configuration of the chassis of the illuminant device according to the present invention.

FIG. 8 is an enlarged sectional view showing a main part in another configuration of the chassis of the illuminant device. In this illuminant device, instead of the concave parts 31e, 33g and the concave parts 32e, 33h provided in the superposed end parts 31c, 33b and the superposed end parts 32c, 33c, respectively, like Embodiment 2, the concave parts 33g, 33h are provided in the end parts 33b, 33c of the third plate body 33, through holes 33k, 33m penetrating in said superposed direction are perforated at a plurality of positions in a longitudinal direction of the concave parts 33g, 33h, and cylindrical bodies 34 (or cylinder parts) projecting in the superposed direction and arranged in the concave parts 33g, 33h are provided in the end parts 31c, 32c of the first and second plate bodies 31, 32. Then the male screws 72 are inserted into the through holes 33k, 33m, and are screwed into the cylindrical bodies 34, thereby connecting the superposed end parts 31c, 33b and the superposed end parts 32c, 33c to each other.

In this illuminant device, the end parts 33b, 33c of the third plate body 33 are superposed on the end parts 31c, 32c of the first and second plate bodies 31, 32 juxtaposed with a distance therebetween, so that the cylindrical bodies 34 provided in the end parts 31c, 32c of the first and second plate bodies 31, 32 are arranged in the concave parts 33g, 33h, respectively, and the male screws 72 are inserted into the through holes 33k, 33m of the concave parts 33g, 33h of the third plate body 33 and the male screws are screwed into the cylindrical bodies 34 of the first and second plate bodies 31, 32, so that the superposed end parts 31c, 33b and the superposed end parts 32c, 33c are connected to each other, respectively. Thus, since the male screws 72 constitute the connecting unit 7 without the strip-shaped plates 71, the assembling workability of the chassis B can be improved. Since the concave parts 33g, 33h are provided in one of the superposed end parts 31c, 33b and one of the superposed end parts 32c, 33c, the connection strength can be improved without use of the strip-shaped plates 71.

Since the other structures and functions are the same as those in Embodiments 1 and 2, the same codes are used to refer to the same parts and the detailed description thereof is omitted.

Embodiment 4

Figure 9:
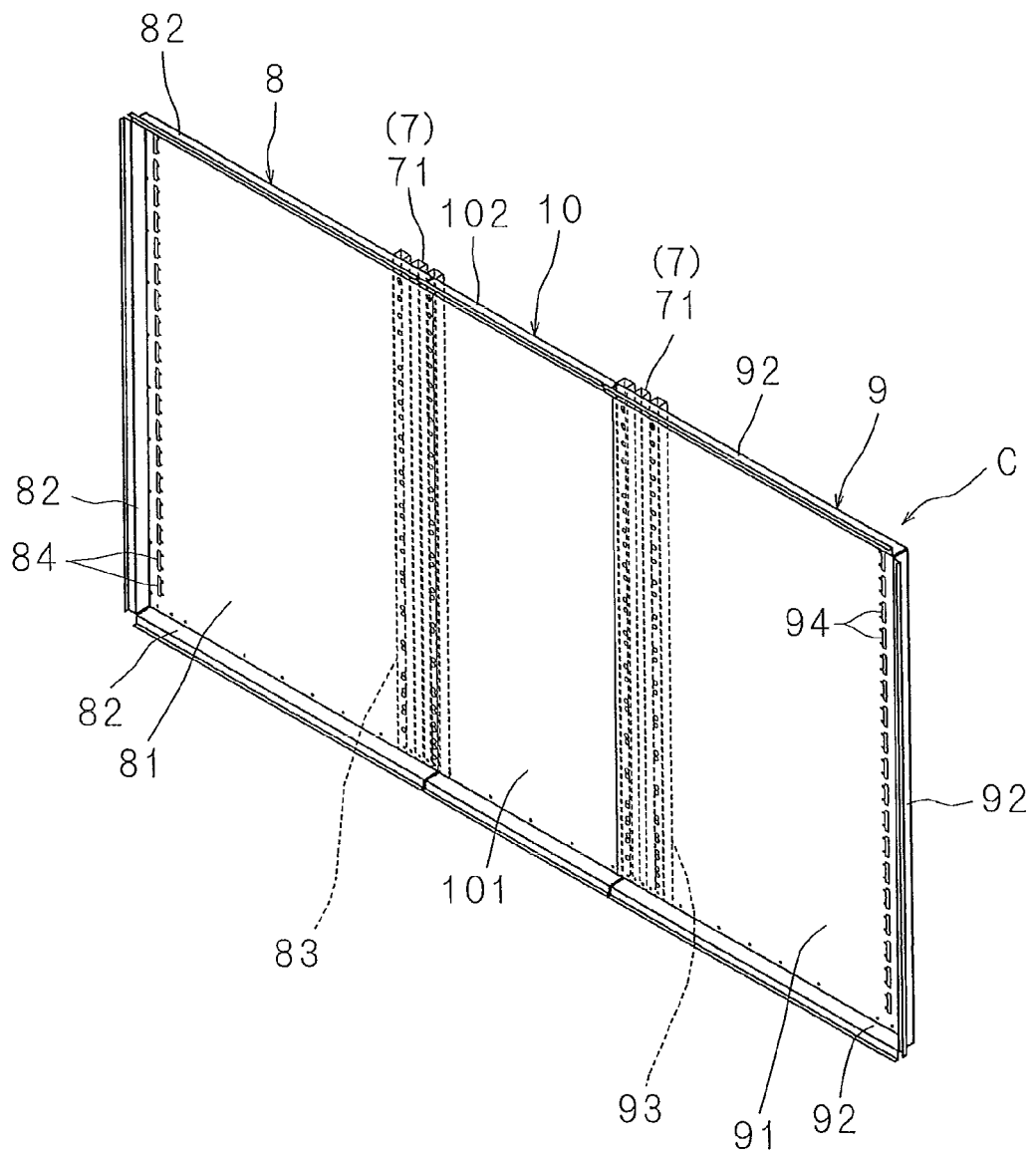
FIG. 9 is a perspective view showing another configuration of the chassis of the illuminant device according to the present invention.
Figure 10:
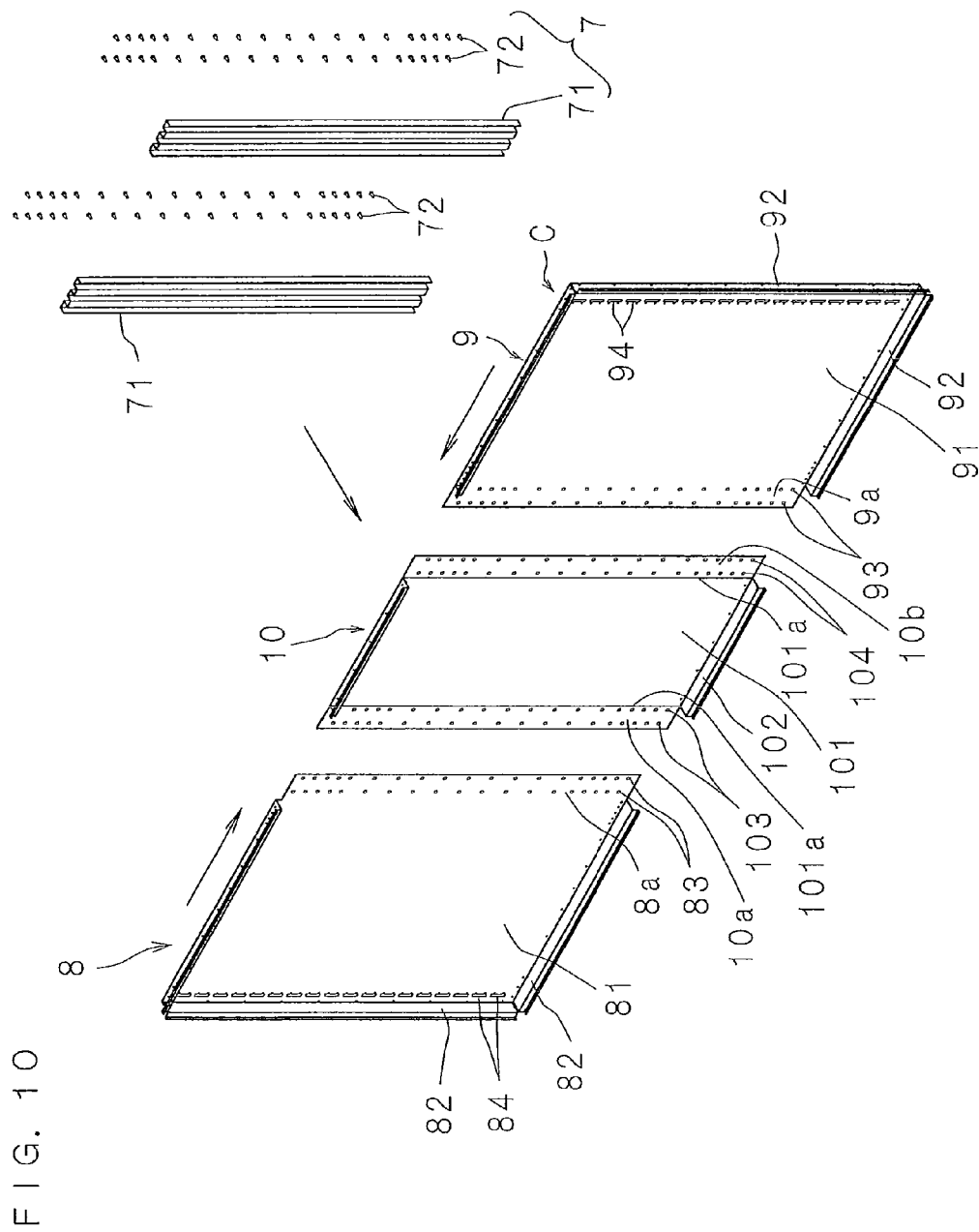
FIG. 10 is an exploded perspective view showing another configuration of the chassis of the illuminant device according to the present invention.
Figure 11:
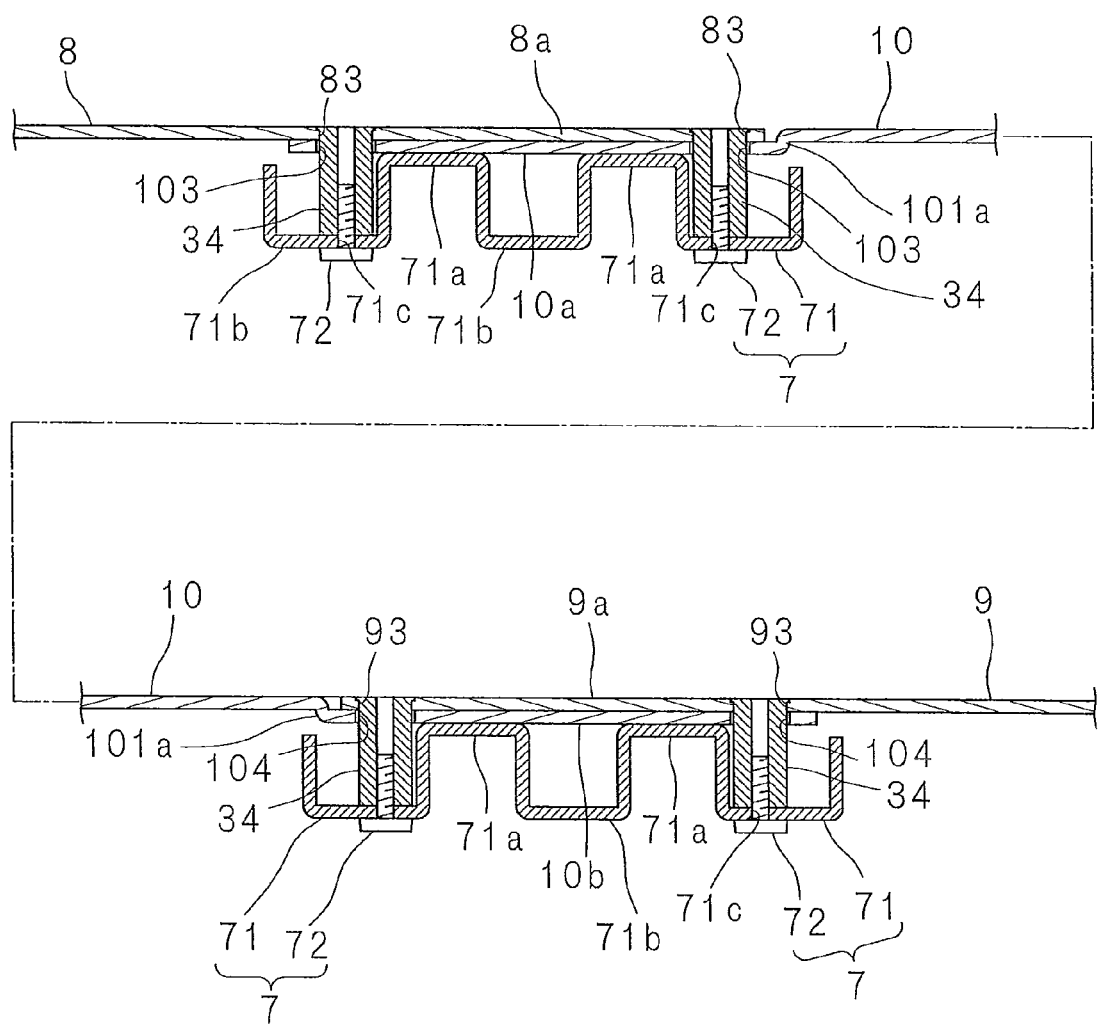
FIG. 11 is an enlarged sectional view showing another configuration of the chassis of the illuminant device according to the present invention.

FIG. 9 is a perspective view showing another configuration of the chassis of the illuminant device, FIG. 10 is an exploded perspective view showing another configuration of the chassis, and FIG. 11 is an enlarged sectional view showing another configuration of the chassis. In this illuminant device, instead of constituting the lid plate 3 of the chassis B having the frame part 2 and the lid plate 3 from the plurality of plate bodies 31, 32, 33, like Embodiments 1 to 3, the chassis C itself is formed from first to third chassis components 8, 9, 10, adjacent end parts 8a, 10a of the chassis components 8, 10 and adjacent end parts 9a, 10b of the chassis components 9, 10 are superposed on each other, respectively, the superposed end parts 8a, 10a and the superposed end parts 9a, 10b are connected to each other by a connecting unit 7 provided with strip-shaped plates 71 and male screws 72, respectively.

The chassis C has an approximately rectangular shape, and comprises first and second chassis components 8, 9 having first to third plate parts 81, 91,101 juxtaposed in the longitudinal direction of the lamps 4 and three bent pieces 82, 92 bent toward an interior side from three edges of each of the first and second plate parts 81, 91 arranged on both sides, a third chassis component 10 having two bent pieces 102 bent toward an interior side from two edges of the third plate part 101 arranged in the center, and strip-shaped plates 71 and male screws 72 connecting the superposed end parts 8a, 10a of the first and third chassis components 8, 10 and the superposed end parts 9a, 10b of the second and third chassis components 9, 10, respectively, so that the bent pieces 82, 92,102 of the chassis components 8, 9, 10 forms a frame shape.

In one end part 8a of the first plate part 81 and one end part 9a of the second plate part 91, a plurality of mounting holes 83, 93 having annular recesses around edges thereof are perforated with a distance therebetween in a direction in which the plate bodies 81, 91,101 are juxtaposed and a direction along ends of said end parts, and the cylindrical bodies 34 having screw holes are mounted in the mounting holes 83, 93, respectively. After the cylindrical bodies 34 are fitted in the mounting holes 83, 93, one ends thereof are fixed by caulking and caulked parts are fitted in said annular recesses. Moreover, insertion holes 84, 94 for connectors to be connected to the lamps 4 and an inverter circuit substrate are provided in a row in the other end parts of the first and second plate parts 81, 91, respectively.

The end parts 10a, 10b of the third plate part 101 are displaced through shoulders 101a, 101a in a plate thickness direction (superposed direction), the end part 8a of the first plate body 81 is superposed on the one end part 10a, and the end part 9a of the second plate body 91 is superposed on the other end part 10b. In the one end part 10a, insertion holes 103 where the cylindrical bodies 34 of the first plate part 81 are inserted, respectively, are perforated with a distance therebetween in the juxtaposition direction of the plate parts 81, 91, 101 and a direction along an end of the one end part 10a, and in the other end part 10b, insertion holes 104 where the cylindrical bodies 34 of the second plate part 91 are inserted, respectively, are perforated with a distance therebetween in the juxtaposition direction of the plate parts 81, 91,101 and a direction along an end of the other end part 10b.

The connecting unit 7 has strip-shaped plates 71 which are superposed on the end parts 10a, 10b of the third plate part 101 and are bent in a concavo-convex shape in a cross section in a direction of the width thereof and in a direction of thickness thereof, and male screws 72 which are screwed into the screw holes of the cylindrical bodies 34 and push and mount the strip-shaped plates 71 on the superposed end parts 8a, 10a, 9a, 10b. Here, the male screws 72 constitute a mounting member.

Each of the strip-shaped plates 71 is bent in a concavo-convex shape with two contact flat surfaces 71a in contact with outer faces of the end parts 10a, 10b, and three concave parts 71b which are depressed from edges on both sides of each of the contact flat surfaces 71a, and through holes 71c corresponding to the cylindrical bodies 34 are perforated in said superposed direction in the two concave parts 71b located on both sides. Each of the through holes 71c has a diameter smaller than that of each of the cylindrical bodies 34, and a tip of each of the cylindrical bodies 34 is in contact with an inner face of each of the concave parts 71b.

The first to third chassis components 8, 9, 10 are connected by the following steps of: juxtaposing the first and second chassis components 8, 9 having the end parts 8a, 9a where the cylindrical bodies 34 are mounted, with a distance therebetween so that the plate parts 81, 91 face upward; arranging the third chassis component 10 between the first and second chassis components 8, 9; inserting the cylindrical bodies 34 of the first chassis component 8 into the insertion holes 103 of the one end part 10a of the third chassis component 10; inserting the cylindrical bodies 34 of the second chassis component 9 into the insertion holes 104 of the other end part 10b of the third chassis component 10; laying the strip-shaped plates 71 on the end parts 10a, 10b of the third chassis component 10, respectively; and then in a condition that the contact flat surfaces 71a of said strip-shaped plates 71 are in contact with the outer faces of the end parts 10a, 10b, inserting the male screws 72 into the through holes 71c perforated in the concave parts 71b of the strip-shaped plates 71; and screwing the male screws into the screw holes of the cylindrical bodies 34. The connecting causes the contact flat surfaces 71a of the strip-shaped plates 71 to push against the end parts 10a, 10b, causes the superposed end parts 8a, 10a and the superposed end parts 9a, 10b to tightly attach to each other, and removes a clearance between the superposed end parts 8a, 10a and a clearance between the superposed end parts 9a, 10b. Moreover, since the end parts 10a, 10b of the third chassis component 10 are displaced in the superposed direction and the end parts 8a, 9a of the first and second chassis components 8, 9 are superposed on the displaced end parts 10a, 10b, a direction in which outside dust enters the chassis C becomes two directions, i.e., said juxtaposition direction and said superposed direction, and the prevention of dust-entering can be improved. Moreover, since an inner face of the chassis C can be made flat, generation of wrinkles of the reflective sheet arranged inside the chassis C can be prevented.

Moreover, in the chassis C, since the end parts of the first and second chassis components 8, 9 consisting of aluminum plates are superposed on and connected to the end parts of the third chassis component 10 consisting of an aluminum plate by the strip-shaped plates 71 and male screws 72, respectively, the weight saving of the chassis C can be achieved even if the illuminant device is comparatively large-sized, and also the rigidity of the chassis C can be improved.

Since the other structures and functions are the same as those in Embodiments 1 to 3, the same codes are used to refer to the same parts and the detailed description thereof is omitted.

Embodiment 5

Figure 12:
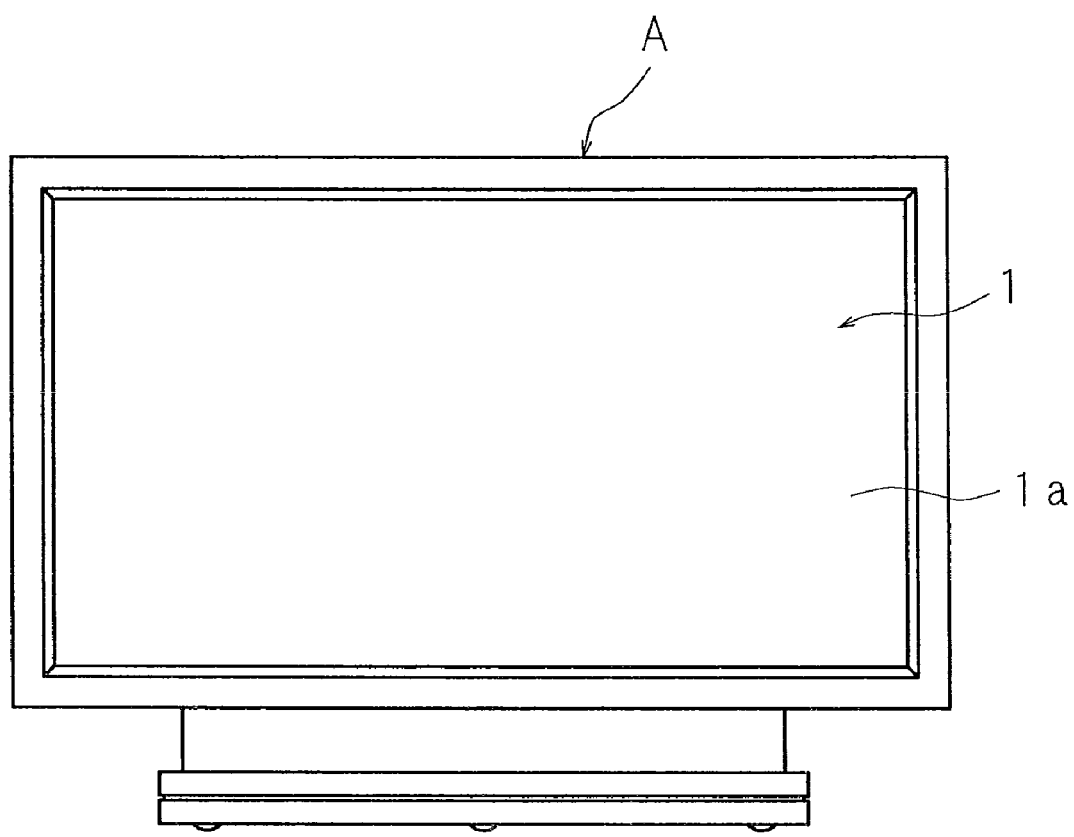
FIG. 12 is a front view showing a configuration of a thin display device provided with the illuminant device according to the present invention.
Figure 13:
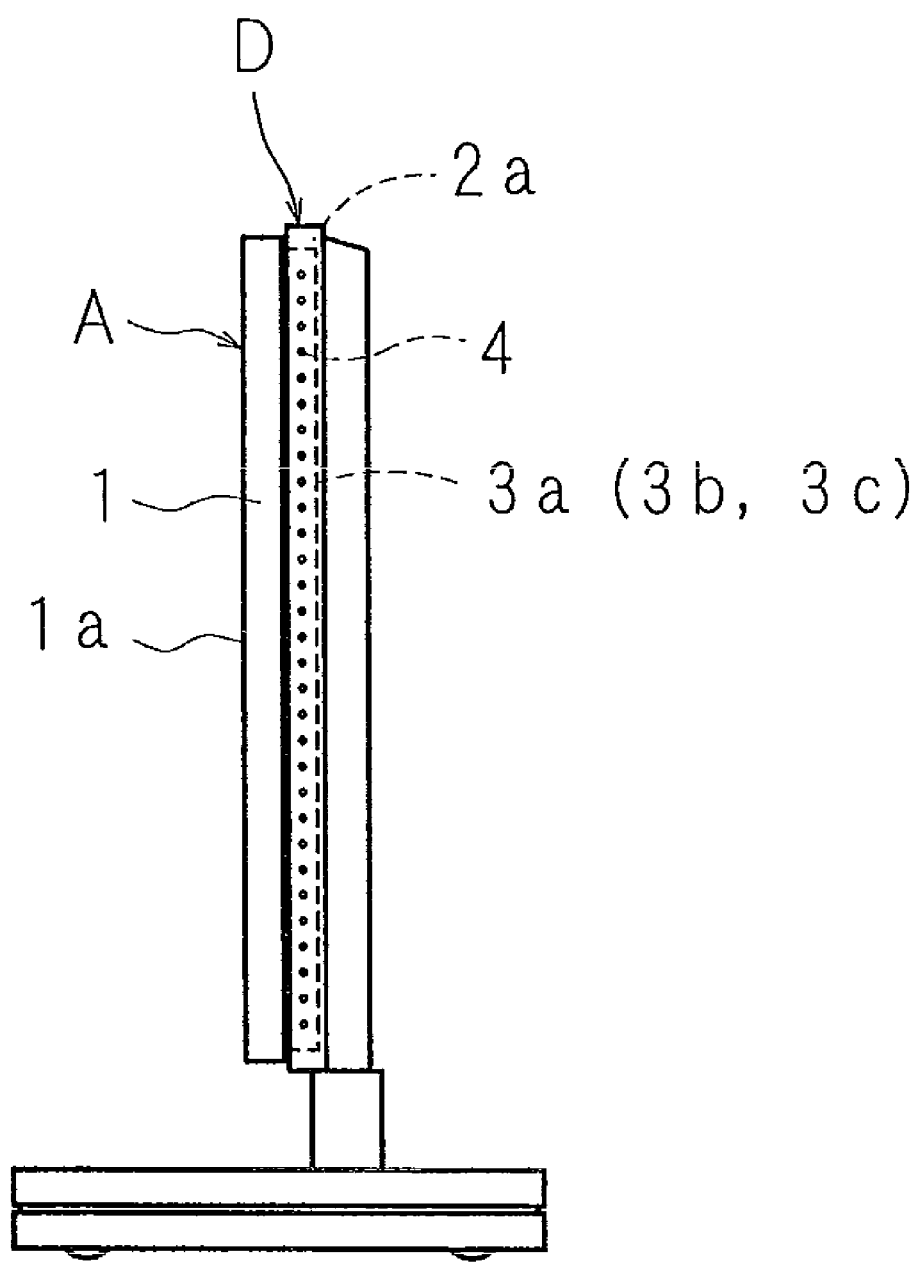
FIG. 13 is a side view showing the configuration of the thin display device provided with the illuminant device according to the present invention.
Figure 14:
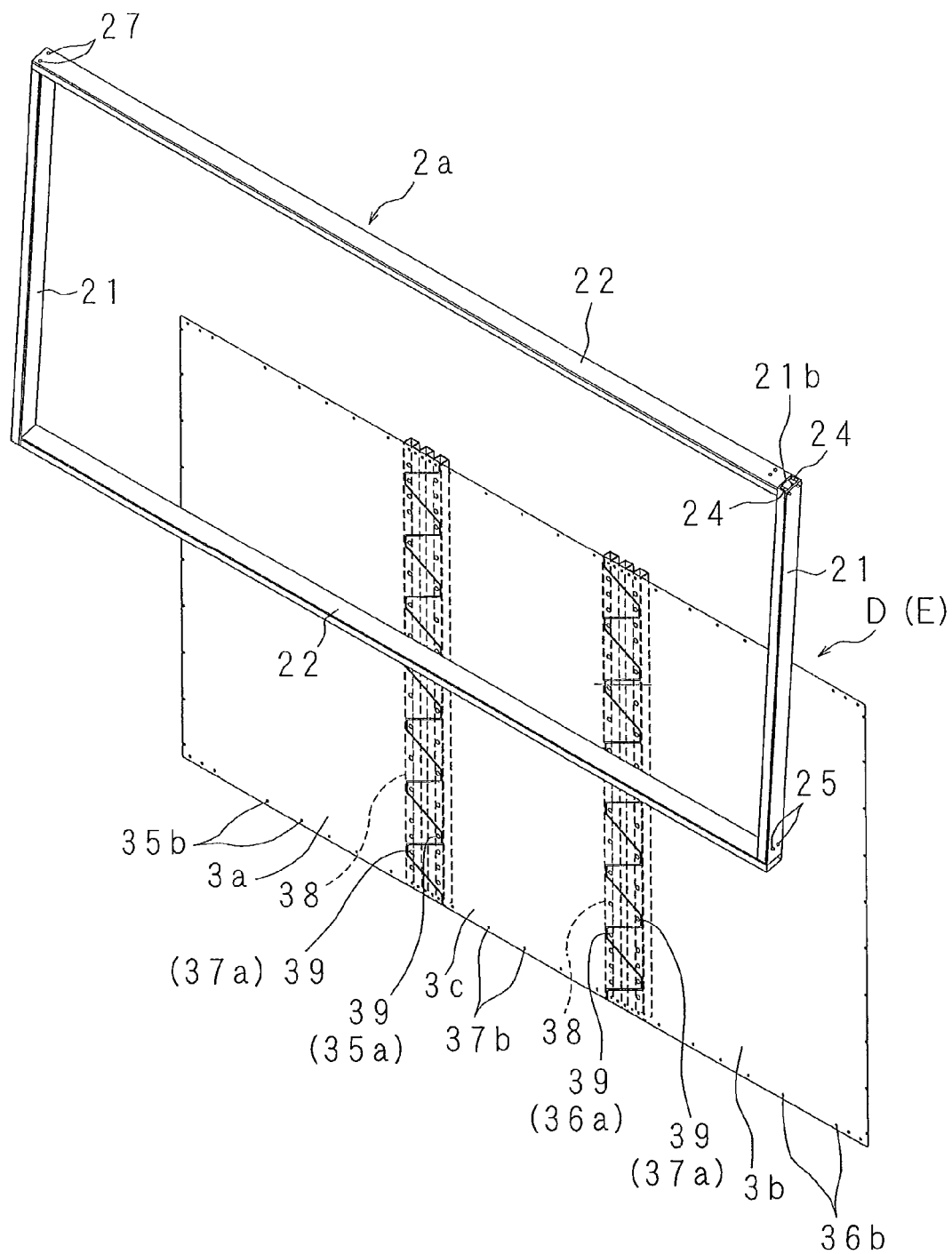
FIG. 14 is an exploded perspective view showing another configuration of the chassis of the illuminant device according to the present invention.
Figure 15:
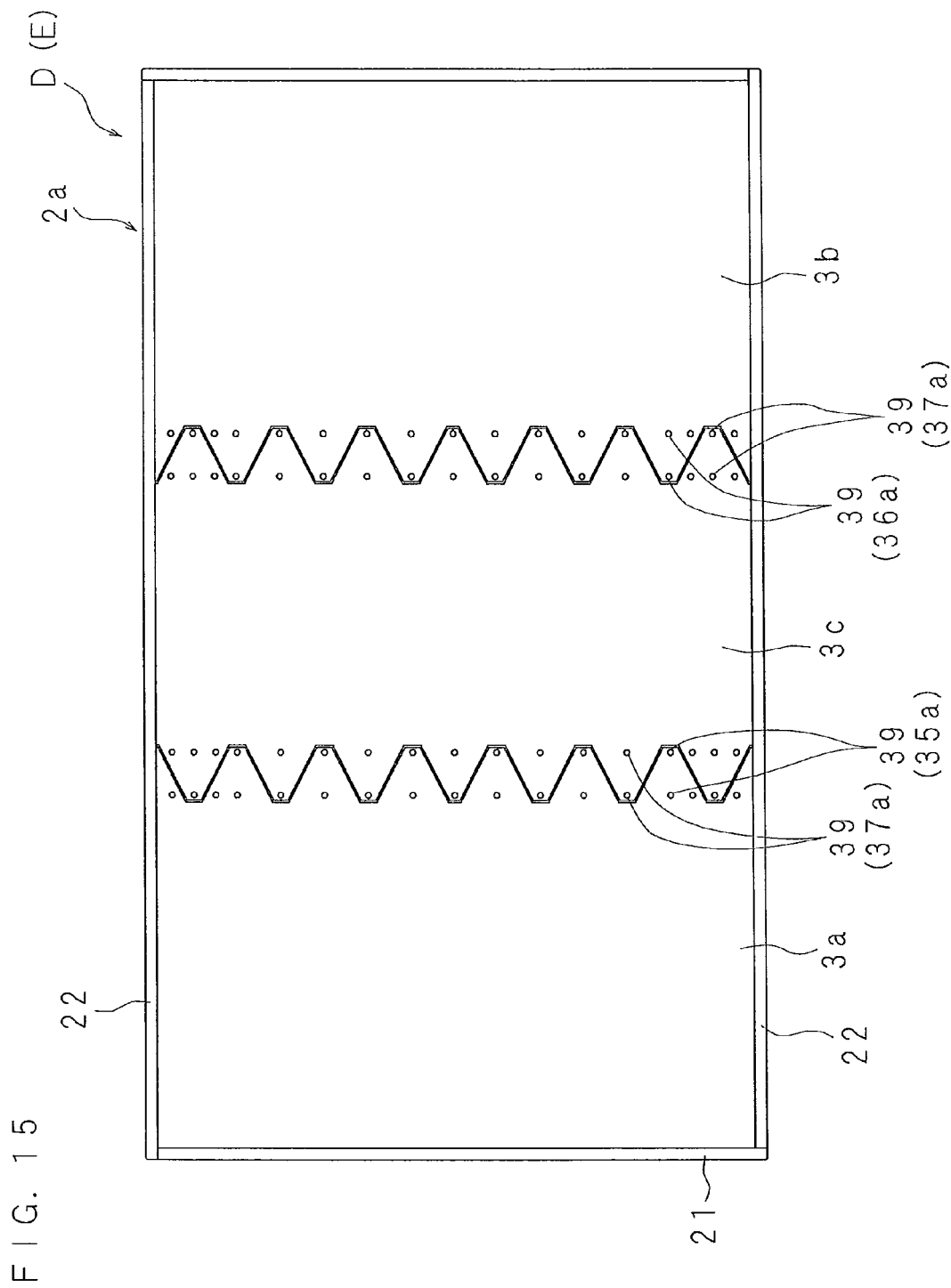
FIG. 15 is a front view showing another configuration of the chassis of the illuminant device according to the present invention.

FIG. 12 is a front view showing a configuration of a thin display device provided with the illuminant device according to the present invention, FIG. 13 is a side view showing the configuration of the thin display device provided with the illuminant device, FIG. 14 is an exploded perspective view showing a configuration of a chassis, and FIG. 15 is a front view showing the configuration of the chassis.

The illustrated illuminant device D is mounted on a rear side of a display unit 1 in a thin display device A provided with the display unit 1 having a display surface 1a on a front side thereof and an approximately rectangular parallelepiped shape. The illuminant device comprises a chassis E having a quadrangular frame part 2a and a plurality of plate bodies 3a, 3b, 3c which close the back side end of the frame body 2a and having a box shape with the front side thereof opening, a plurality of rod-shaped lamps 4 juxtaposed with a distance therebetween up and down in the chassis E, a holder holding both end parts of said lamps 4, a plurality of clips holding intermediate parts of said lamps 4 with respect to the plate bodies 3a, 3b, 3c, a reflective sheet which is arranged in the chassis E and reflects light emitted by the lamps 4 to an opening portion side of the chassis E, and an electrical component such as an inverter circuit substrate mounted on outer faces of the plate bodies 3a, 3b, 3c.

The lamps 4 are cold cathode tubes having electrodes in both end parts thereof, and the inverter circuit substrate is connected to the electrode of each lamp 4, and controls a luminosity by a pulse width modulation signal.

Figure 16:
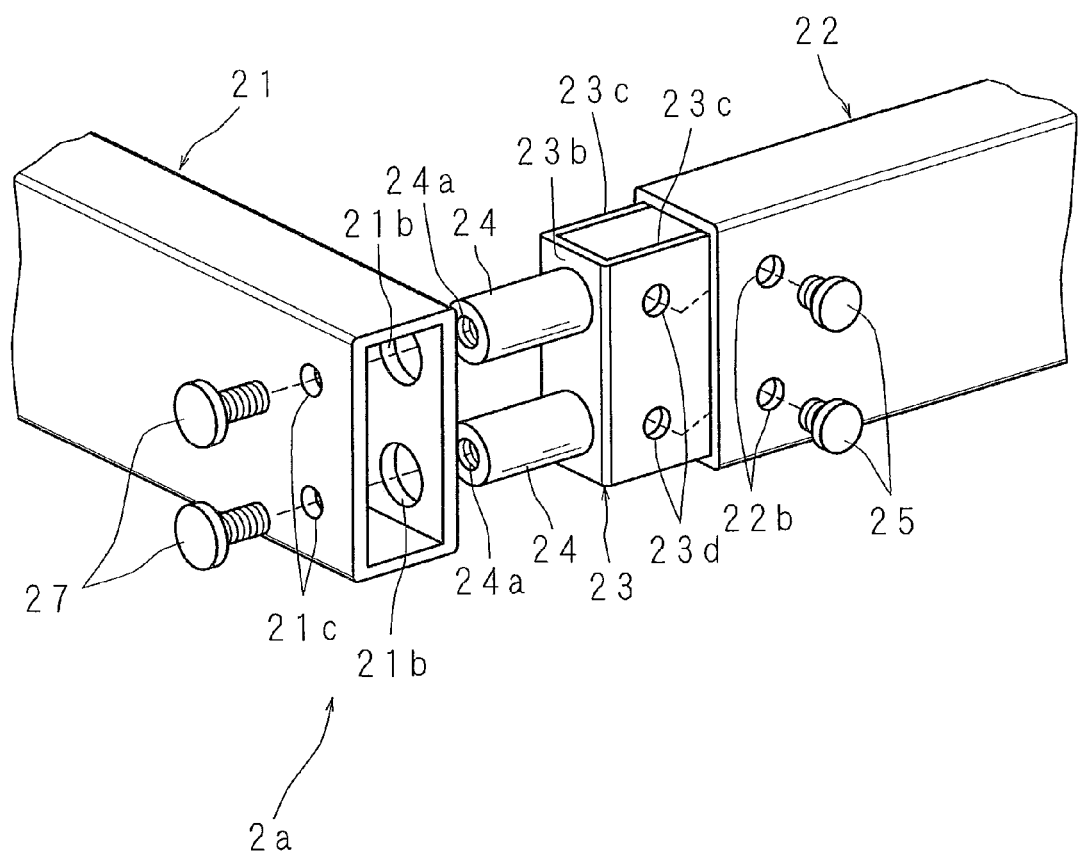
FIG. 16 is an exploded perspective view showing a configuration of a frame body of the chassis of the illuminant device according to the present invention.
Figure 17:
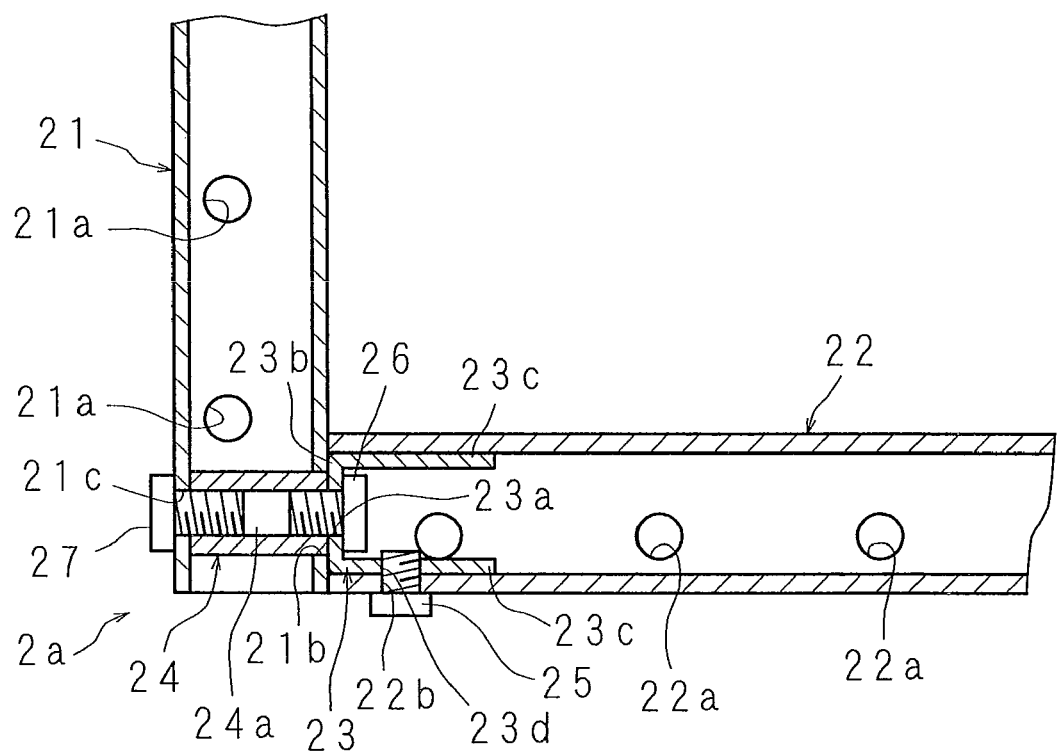
FIG. 17 is a sectional view showing the configuration of the frame body of the chassis of the illuminant device according to the present invention.
Figure 18:
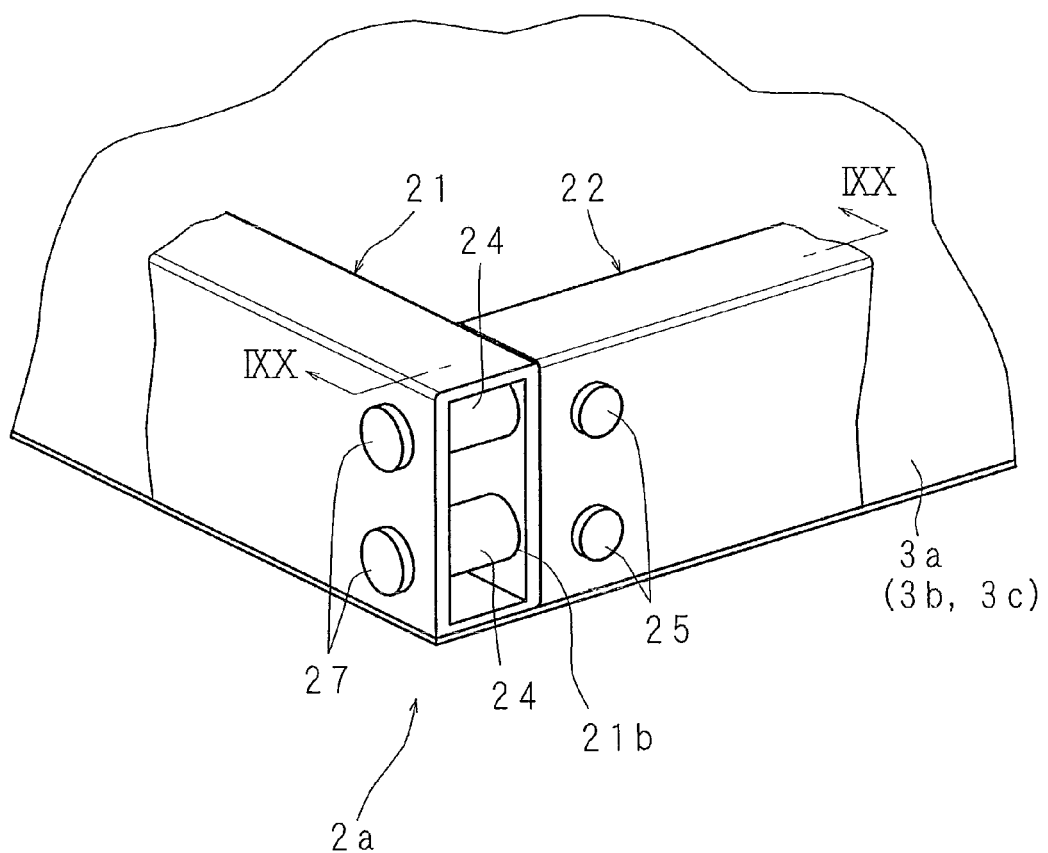
FIG. 18 is a perspective view showing a corner portion in the configuration of the frame body of the chassis of the illuminant device according to the present invention.
Figure 19:
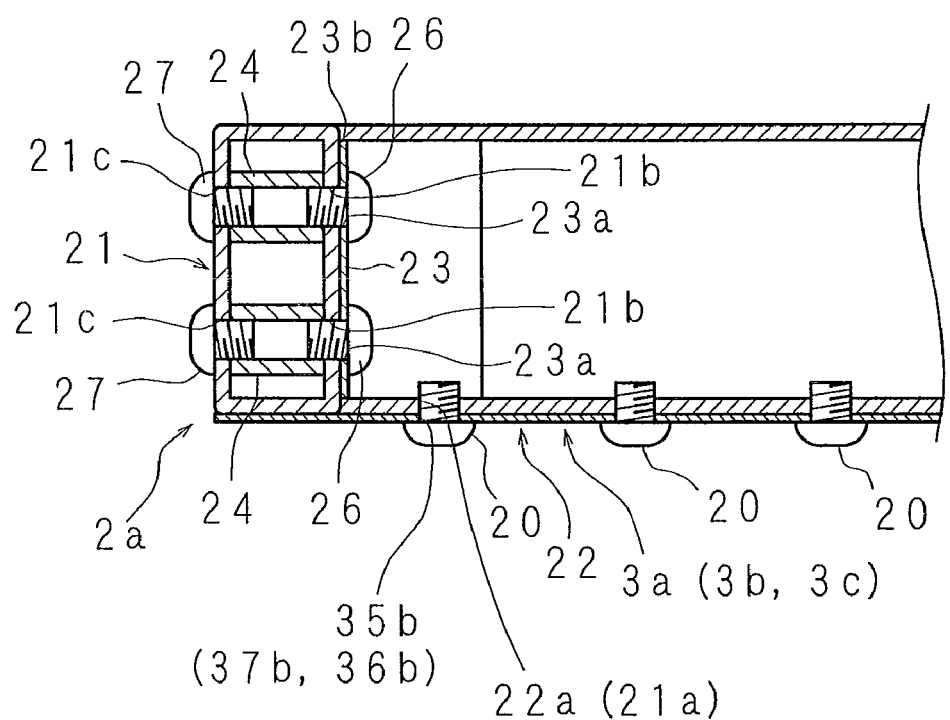
FIG. 19 is a sectional view taken along line IXX-IXX in FIG. 18.

FIG. 16 is an exploded perspective view showing the configuration of the frame body 2a of the chassis E, FIG. 17 is a sectional view showing the configuration of the frame body 2a of the chassis E, FIG. 18 is a perspective view showing a corner portion in the configuration of the frame body 2a of the chassis E, and FIG. 19 is a sectional view taken along line IXX-IXX in FIG. 18. The frame body 2a of the chassis E comprises two first rectangular cylindrical bodies 21, 21 which have a quadrangular shape in cross section and oppose to each other in parallel with a distance therebetween, and two second rectangular cylindrical bodies 22, 22 which have a quadrangular shape in cross section and are connected to both ends of the first rectangular cylindrical bodies 21, 21, and a plurality of screw holes 21a, 22a are perforated with a distance therebetween in a longitudinal direction thereof on one of the side surfaces of shorter sides of each of the first and second rectangular cylindrical bodies 21, 22. Here, the first and second rectangular cylindrical bodies 21, 22 constitute frame components and cylindrical bodies.

One end part of each of the first rectangular cylindrical bodies 21, 21 includes two fitting holes 21b, 21b penetrating one side surface of a longer side thereof and juxtaposed with a distance therebetween toward the shorter sides, and two insertion holes 21c, 21c penetrating the other side surface of the longer side at positions facing the fitting holes 21b, 21b and having diameters smaller than those of the fitting holes 21b, 21b.

One end part of each of the second rectangular cylindrical bodies 22, 22 includes a fit-in member 23 fitted and fixed into each of said rectangular cylindrical bodies 22, 22, two fitting shafts 24, 24 which are fixed to said fit-in member 23 and are fitted in the fitting holes 21b, 21b, respectively, and two through holes 22b, 22b penetrating the one side surface of the longer side and juxtaposed with a distance therebetween toward the shorter sides.

Each of the fit-in members 23 has a rectangular shape, closes an end of each of the second rectangular cylindrical bodies 22, 22, and includes an outer plate part 23b having two insertion holes 23a, 23a penetrating in a longitudinal direction of the rectangular cylindrical bodies 22, 22, and two inner plate parts 23c, 23c arranged continuing to longer sides of the outer plate part 23b. Two screw holes 23d, 23d are perforated in one inner plate part 23c at positions corresponding to the through holes 22b, 22b, and two headed male screws 25, 25 to be inserted in the through holes 22b, 22b are screwed into the screw holes 23d, 23d, and thereby the fit-in members 23 are fixed in the second rectangular cylindrical body 22, 22.

The fitting shafts 24, 24 respectively have screw holes 24a, 24a in central portions thereof, consist of circular cylinder bodies having a diameter slightly smaller than an inside diameter of each of the fitting holes 21b, 21b, and have a length in which end faces on the tip side are in contact with the inner surfaces (the other side surfaces of the longer sides) of the first rectangular cylindrical bodies 21, 21. The fitting shafts 24, 24 are fixed to an outer face of the outer plate part 23b by the screwing into the screw holes 24a, 24a of headed male screws 26, 26 inserted into the insertion holes 23a, 23a from an interior of the outer plate part 23b. Headed male screws 27, 27 inserted into the insertion holes 21c, 21c of the first rectangular cylindrical bodies 21, 21 are screwed into the screw holes 24a and 24a, and thereby preventing the fitting shafts 24, 24 from escaping from the fitting holes 21b, 21b. Here, the male screws 27, 27 constitute escape preventing means (an escape preventing unit).

As mentioned above, in the peripheral surfaces of the one end parts of the first rectangular cylindrical bodies 21, 21, the fitting holes 21b, 21b and insertion holes 21c, 21c are perforated, and the fit-in members 23 to which the fitting shafts 24, 24 are fixed are fixed by the male screws 25, 25 to the other end parts of the first rectangular cylindrical bodies 21, 21. Moreover, the fitting holes 21b, 21b and the insertion holes 21c, 21c are perforated in the peripheral surfaces of the end parts of the second rectangular cylindrical bodies 22, 22 other than the end parts thereof to which the fit-in members 23 where the fitting shafts 24, 24 are fixed are fixed by the male screws 25, 25.

In the frame body 2a constituted as mentioned above, four sides are formed by the two first rectangular cylindrical bodies 21, 21 which oppose with a distance therebetween and the two second rectangular cylindrical bodies 22, 22 connected to the both ends of the first rectangular cylindrical bodies 21, 21, and each of the corner portions of the four sides is connected by the fitting holes 21b, 21b and the fitting shafts 24, 24 fitted in the fitting holes 21b, 21b, and the male screws 27, 27 prevent the fitting shafts 24, 24 from escaping. The fitting shafts 24, 24 are fixed to each of the fit-in members 23, and each of the fit-in members 23 is fitted and fixed into one end part of each of the second rectangular cylindrical bodies 22, 22 and one end part of each of the first rectangular cylindrical bodies 21, 21. Moreover, the plate bodies 3a, 3b, 3c are juxtaposed and mounted on the frame body 2a with male screws 20 screwed into the screw holes 21a, 22a of the first and second rectangular cylindrical bodies 21, 22.

Figure 20:
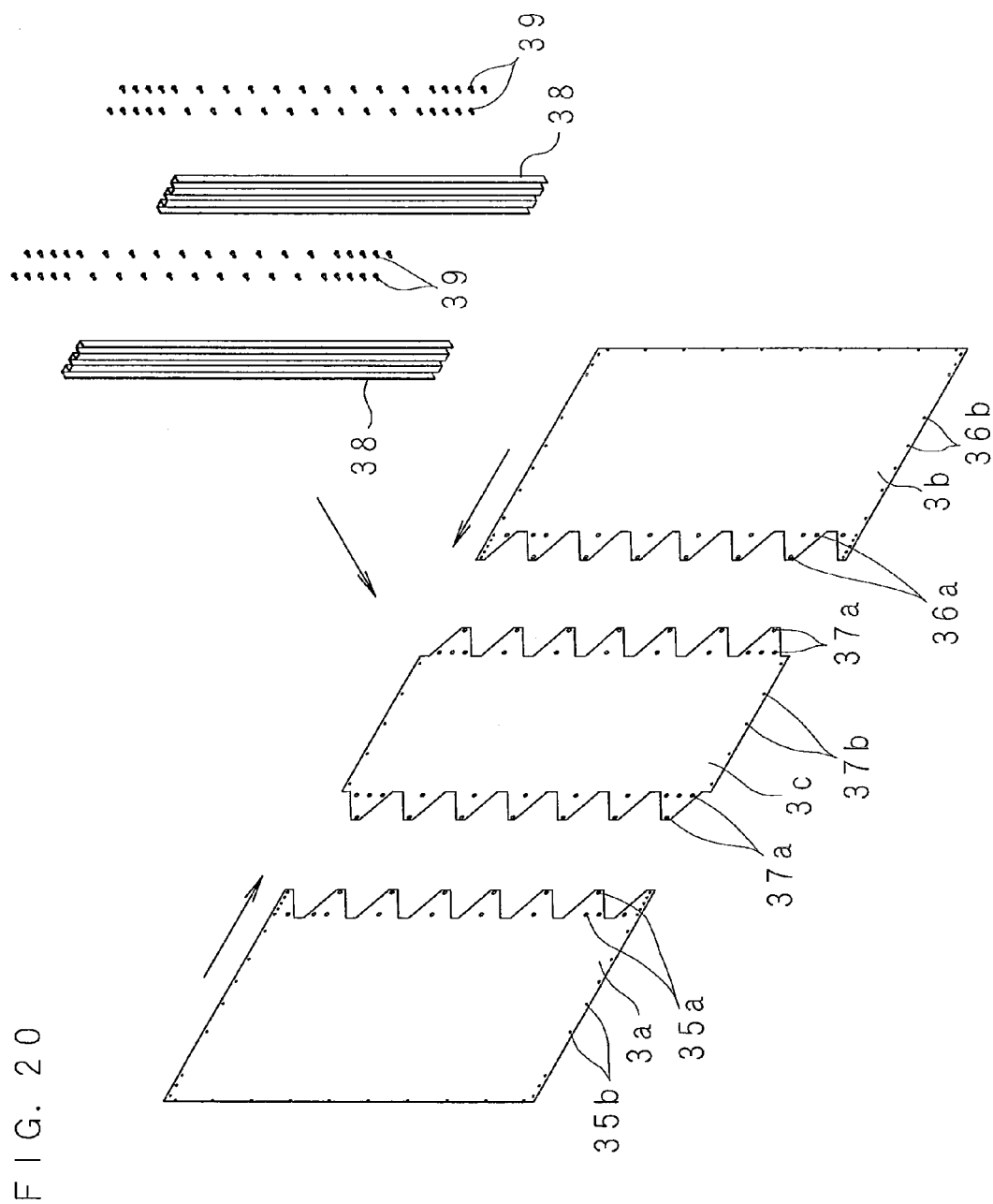
FIG. 20 is an exploded perspective view showing a configuration of a plate body of the chassis of the illuminant device according to the present invention.

FIG. 20 is an exploded perspective view showing the configuration of the plate bodies 3a, 3b, 3c of the chassis E with which the illuminant device is provided. The plate bodies 3a, 3b, 3c have an approximately rectangular shape corresponding to the frame body 2a, and are juxtaposed in the longitudinal direction of the first rectangular cylindrical bodies 21, 21 and the longitudinal direction of the lamps 4. In edge portions where adjacent plate bodies 3a, 3b, 3c oppose mutually, a plurality of pin holes 35a, 36a, 37a are perforated along the edge portions. The opposing edge portions are connected to each other by two connecting members 38, 38. Moreover, in non-opposing edge portions thereof, a plurality of insertion holes 35b, 36b, 37b are perforated along the non-opposing edge portions, corresponding to the screw holes 21a, 22a of the first and second rectangular cylindrical bodies 21, 22. The plate bodies 3a, 3b, 3c are mounted on the frame body 2a by the screwing into the screw holes 21a, 22a of the male screws 20 inserted in the insertion holes 35b, 36b, 37b.

Moreover, the edge portions of the plate bodies 3a, 3b, 3c which oppose mutually have concavities and convexities, and when the plate bodies 3a, 3b, 3c are juxtaposed, the concavities are engaged with the convexities, respectively. The pin holes 35a, 36a, 37a are perforated in the concavities.

The connecting members 38 consist of strip-shaped plates having a plurality of concavo-concave streaks in a cross section in a direction of the width thereof and made of a columnar iron plate etc., and has a length corresponding to each of lengths of the plate bodies 3a, 3b, 3c. Moreover, a plurality of pin holes are perforated on both side parts in a direction of width thereof, corresponding to the pin holes 35a, 36a, 37a.

In the chassis E of the illuminant device constituted as mentioned above, the plate bodies 3a, 3b, 3c are juxtaposed on the back side end of the frame body 2a, to be specific, on one of the side surfaces of the shorter sides of each of the first and second rectangular cylindrical bodies 21, 22, the male screws 20 are inserted into the insertion holes 35b, 36b, 37b perforated in the peripheral portion corresponding to the frame body 2a, and the male screws 20 are screwed into the screw holes 21a, 22a of the rectangular cylindrical bodies 21, 22, and thereby the plate bodies 3a, 3b, 3c are fixed to the frame body 2a. Moreover, the connecting members 38, 38 are laid on the edge portions of the plate bodies 3a, 3b, 3c which oppose mutually, and pins 39 are fitted through the pin holes of the connecting members 38, 38 in the pin holes 35a, 36a, 37a of the plate bodies 3a, 3b, 3c, and thereby the plate bodies 3a, 3b, 3c are connected to each other. In this case, the both ends in the longitudinal direction of the connecting members 38, 38 are fixed to the rectangular cylindrical bodies 22, 22 with male screws, and thereby fixing strength of the plate bodies 3a, 3b, 3c with respect to the frame body 2a can be increased. Note that the connecting members 38, 38 and the pins 39 constitute a connecting unit.

Since the opposing edge portions of the plate bodies 3a, 3b, 3c are arranged apart from the connecting parts (corner portions of the frame body) of the rectangular cylindrical bodies 21, 22 in the circumferential direction of the frame body 2a as shown in FIGS. 14 and 15, the plate bodies 3a, 3b, 3c fixed to the frame body 2a can further improve the torsion rigidity of the chassis E.

Embodiment 6

Figure 21:
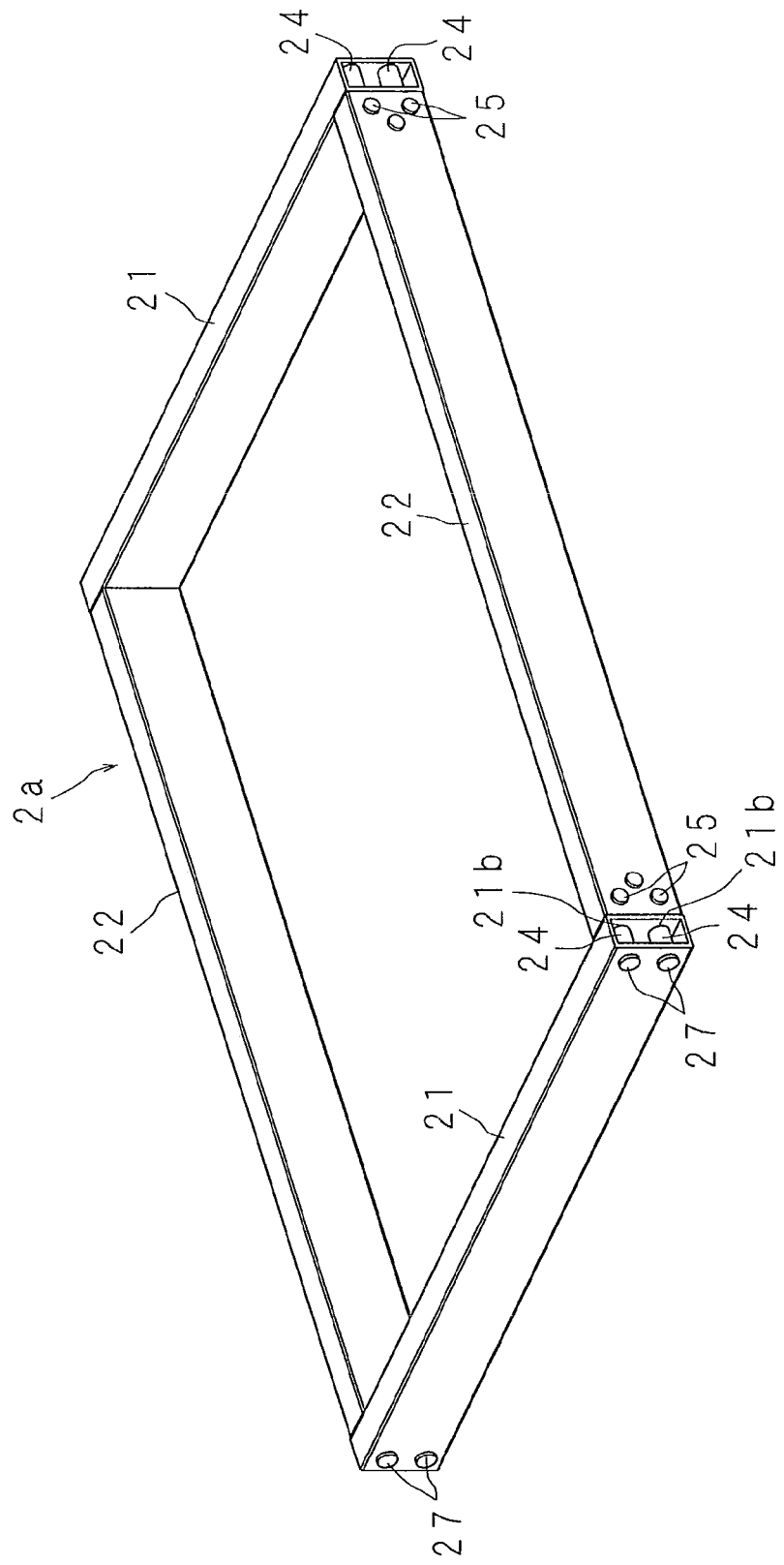
FIG. 21 is a perspective view showing another configuration of the chassis of the illuminant device according to the present invention.

FIG. 21 is a perspective view showing another configuration of the chassis E of the illuminant device. In the frame body 2a, the fitting holes 21b, 21b and insertion holes 21c, 21c are perforated in peripheral surfaces of both end parts of the first rectangular cylindrical bodies 21, 21 arranged in parallel with a distance therebetween. The fit-in members 23 to which the fitting shafts 24, 24 are fixed are fixed to both end parts of the second rectangular cylindrical bodies 22, 22 by the male screws 25, 25. The end parts of the first and second rectangular cylindrical bodies 21, 22 are connected to each other by the male screws 27, 27 screwed from the insertion holes 21c, 21c into the screw holes 24a, 24a of the fitting shafts 24, 24.

In the frame body 2a, since the shapes of the both end parts of the first and second rectangular cylindrical bodies 21, 22 are equal, The mistake of parts are reduced in a case of processing and assembling, and processability and assembling workability can be improved.

Since the other structures and functions are the same as those in Embodiment 5, the same codes are used to refer to the same parts and the detailed description thereof is omitted.

Embodiment 7

Figure 22:
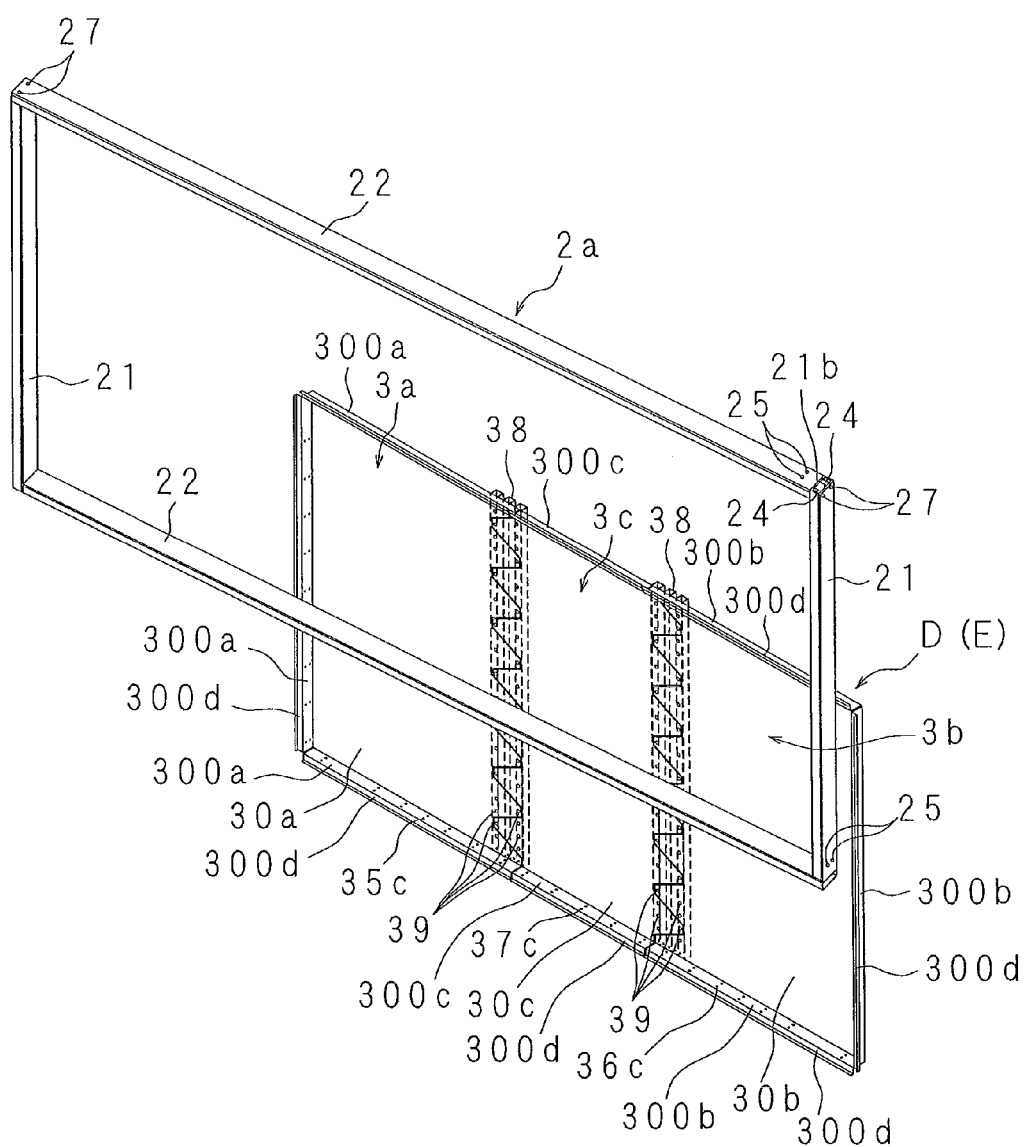
FIG. 22 is an exploded perspective view showing another configuration of the chassis of the illuminant device according to the present invention.
Figure 23:
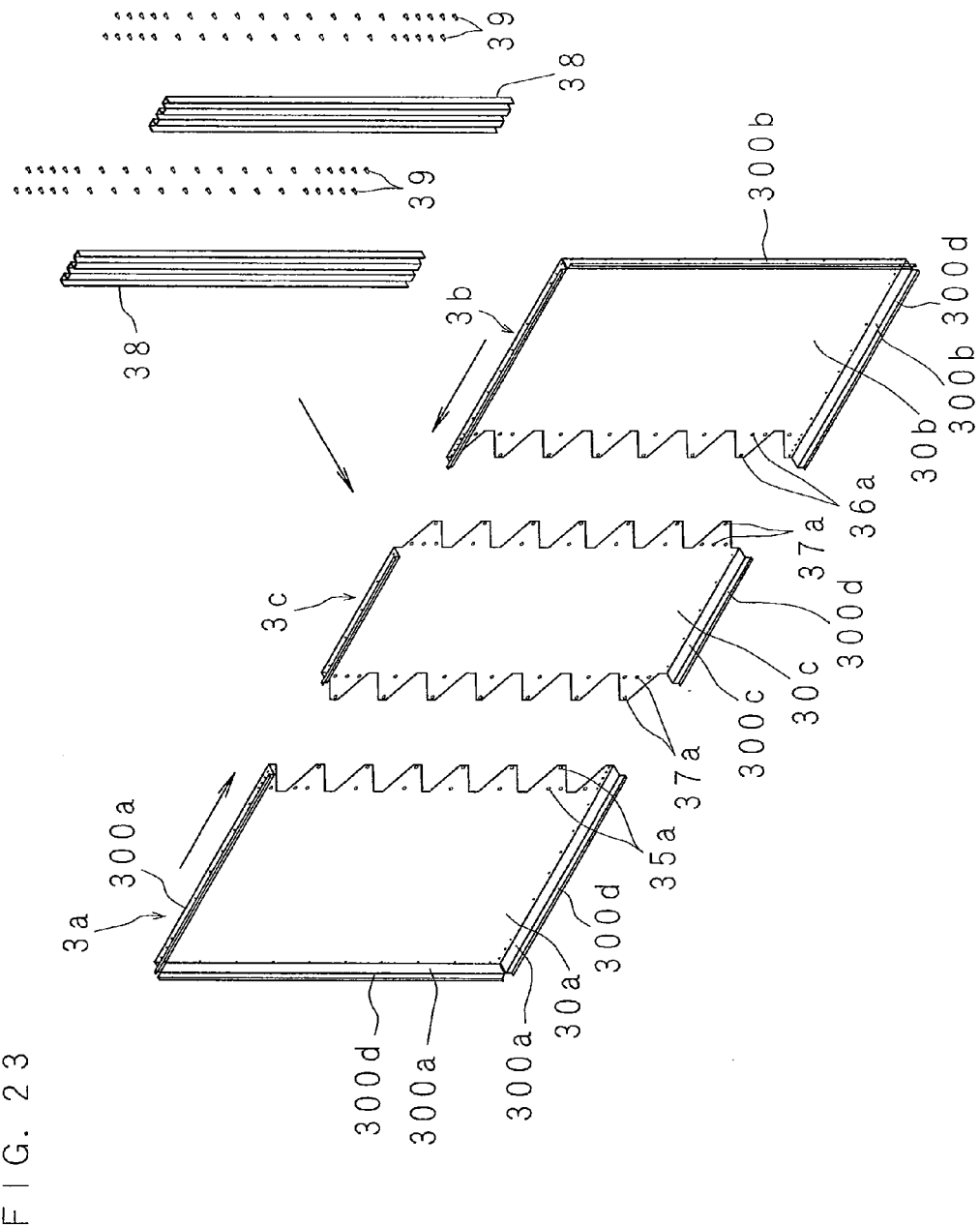
FIG. 23 is an exploded perspective view showing another configuration of the plate body of the chassis of the illuminant device according to the present invention.

FIG. 22 is an exploded perspective view showing another configuration of the chassis E of the illuminant device, and FIG. 23 is an exploded perspective view showing another configuration of the plate bodies 3a, 3b, 3c of the chassis E. In the illuminant device, instead of making the plate bodies 3a, 3b, 3c of the chassis E flat like Embodiment 5, the plate bodies 3a, 3b, 3c have plate parts 30a, 30b, 30c and rising pieces 300a, 300b, 300c rising from non-opposing edges of the plate parts 30a, 30b, 30c (bent pieces 300a, 300b, 300c which are bent from non-opposing edges of the plate parts 30a, 30b, 30c), and the plate bodies 3a, 3b, 3c are mounted on the frame body 2a so that the rising pieces 300a, 300b, 300c form a frame shape.

The plate body 3c arranged at a central portion of the frame body 2a has the rising pieces 300c, 300c rising from the two non-opposing edges, and the plate bodies 3a, 3b arranged on both sides of the frame body 2a have the rising pieces 300a, 300b rising from the three non-opposing edges, and flanges 300d, 300d, 300d extending outward are provided in top parts of the rising pieces 300a, 300b, 300c. Moreover, a plurality of insertion holes 35c, 36c, 37c are perforated in at least either the rising pieces 300a, 300b, 300c or the flanges 300d, respectively.

In the frame body 2a, screw holes 21a, 22a are perforated in at least one or the other side surface of each of the longer sides of the first and second rectangular cylindrical bodies 21, 22 and one or the other side surface of each of the shorter sides thereof, corresponding to the insertion holes 35c, 36c, 37c of the rising pieces 300a, 300b, 300c or the flange 300d, respectively.

FIGS. 24 to 27 are sectional views showing the configuration of embodiment 7 of the chassis E. In the chassis E of the illuminant device constituted as mentioned above, as shown in FIGS. 24 to 27, the rising pieces 300a, 300b, 300c form a frame shape, and the plate bodies 3a, 3b, 3c are mounted on the frame body 2a.

Figure 24:
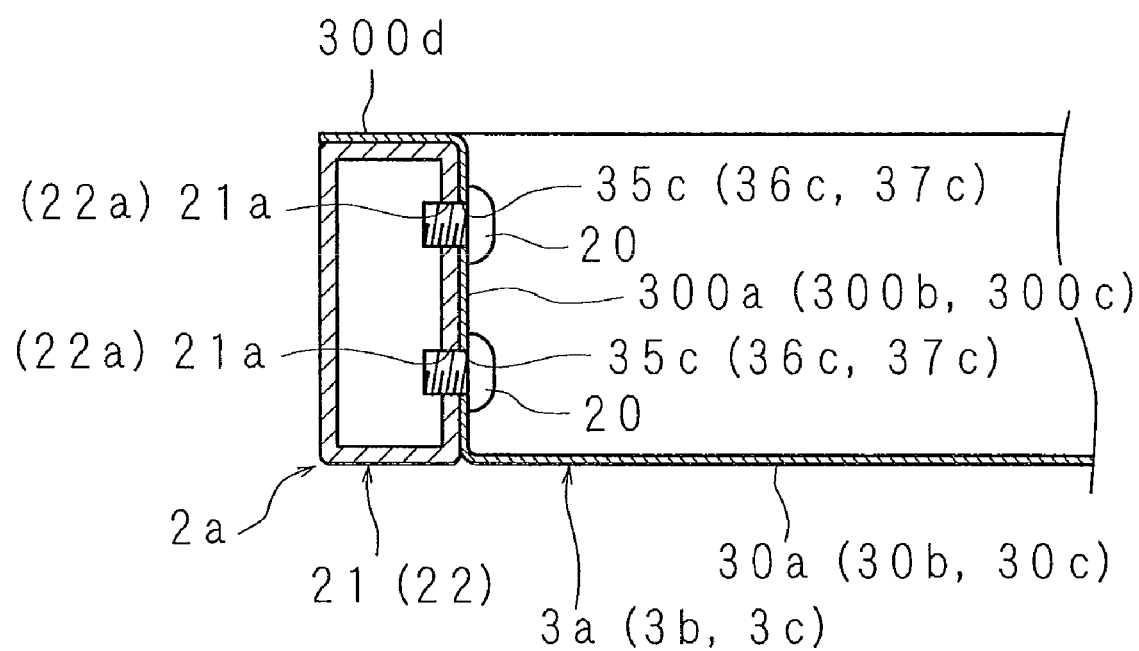
FIG. 24 is a sectional view showing a configuration of Embodiment 7 of the chassis of the illuminant device according to the present invention.

In FIG. 24, the frame body 2a is arranged outside the rising pieces 300a, 300b, 300c, and the plate bodies 3a, 3b, 3c are mounted on the frame body 2a by the male screws 20 inserted into the insertion holes 35c, 36c, 37c perforated in at least either the rising pieces 300a, 300b, 300c or the flanges 300d and screwed into the screw holes 21a, 22a.

Figure 25:
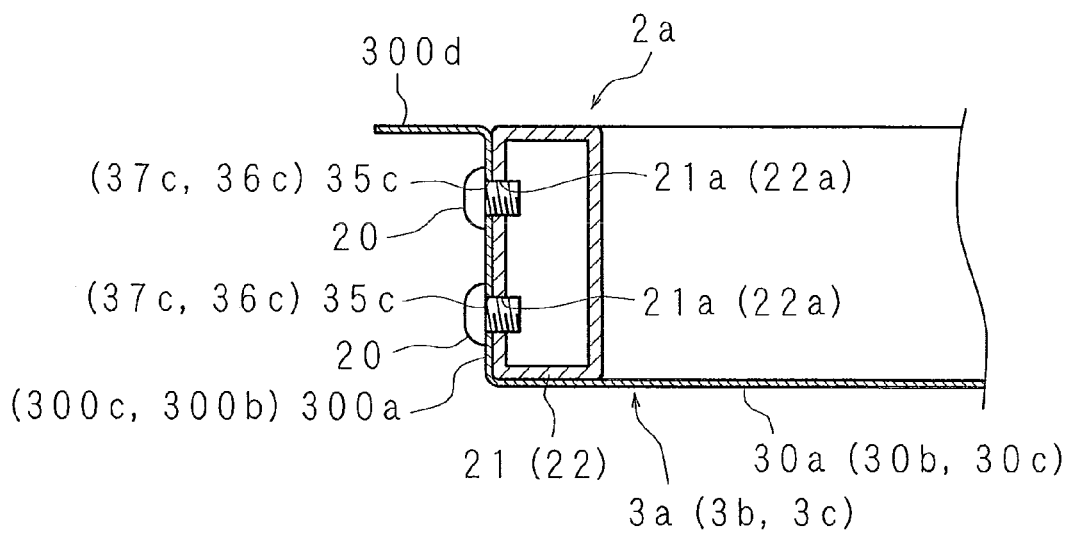
FIG. 25 is a sectional view showing the configuration of Embodiment 7 of the chassis of the illuminant device according to the present invention.

In FIG. 25, the frame body 2a is arranged inside the rising pieces 300a, 300b, 300c, and the plate bodies 3a, 3b, 3c are mounted on the frame body 2a by the male screws 20 inserted into the insertion holes 35c, 36c, 37c perforated in the rising pieces 300a, 300b, 300c, and screwed into the screw holes 21a, 22a.

In FIG. 26, the frame body 2a is arranged outside a peripheral portion of the plate parts 30a, 30b, 30c, and the plate parts 30a, 30b, 30c are mounted on the frame body 2a. The plurality of insertion holes 35c, 36c, 37c are perforated in the peripheral portion of the plate parts 30a, 30b, 30c, the plurality of screw holes 21a, 22a are perforated in the one of the side surfaces of the shorter sides of each of the first and second rectangular cylindrical bodies 21, 22, and the plate bodies 3a, 3b, 3c are mounted on the frame body 2a by the male screws 20 inserted into the insertion holes 35c, 36c, 37c and screwed into the screw holes 21a, 22a. Here, the embodiment shown in FIG. 26 may be constructed with at least one of the configurations of FIGS. 24 and 25 combined therewith.

Figure 27:
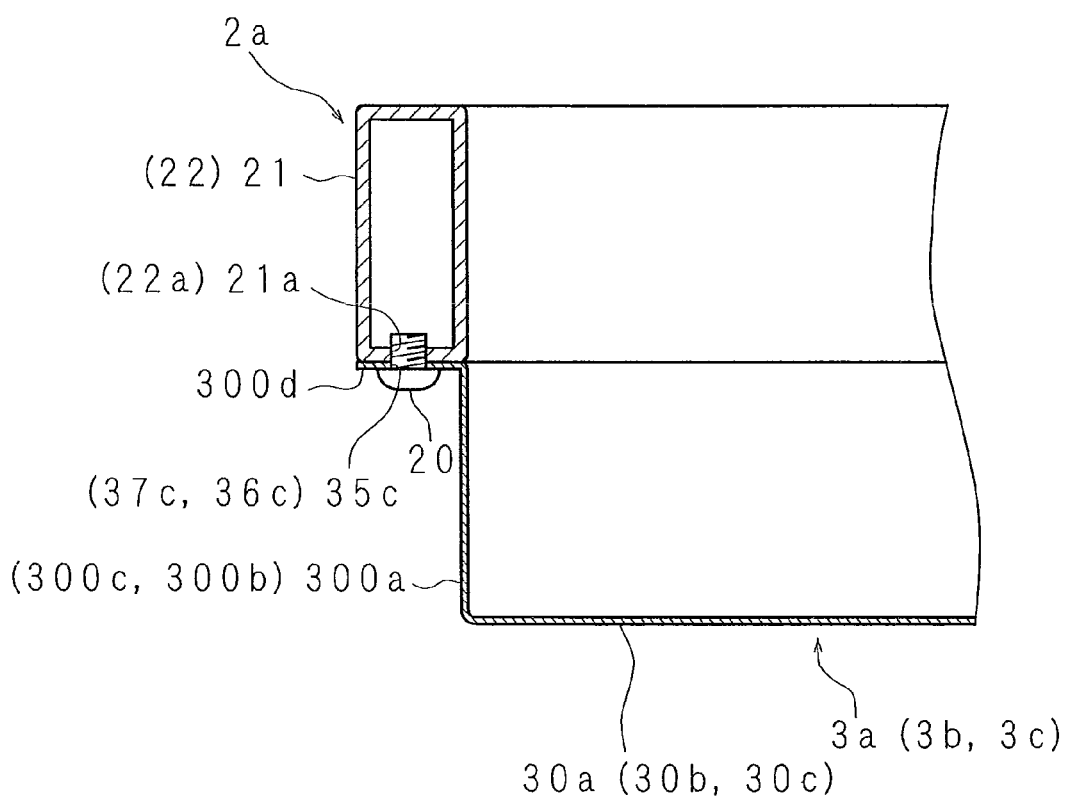
FIG. 27 is a sectional view showing the configuration of Embodiment 7 of the chassis of the illuminant device according to the present invention.

In FIG. 27, the frame body 2a is arranged outside the flanges 300d, and the plate bodies 3a, 3b, 3c are mounted on the frame body 2a by the male screws 20 inserted into the insertion holes 35c, 36c, 37c perforated in the flanges 300d and screwed into the screw holes 21a, 22a. Here, the embodiment shown in FIG. 27 may be constructed with at least one of the configurations of FIGS. 24 to 26 combined therewith.

In FIGS. 24 to 27, since the opposing edges of the plate bodies 3a, 3b, 3c are arranged apart from the connecting parts of the rectangular cylindrical bodies 21, 22 in the circumferential direction of the frame body 2a, the torsion rigidity of the chassis E can be further improved. Moreover, in the configuration where the frame body 2a is arranged inside the rising pieces 300a, 300b, 300c as shown in FIG. 25, since a peripheral portion of an optical sheet can be laid on the shorter sides of the rectangular cylindrical bodies 21, 22 in the frame body 2a, the frame body 2a serves as a sheet receiving base for supporting the optical sheet, and a dedicated sheet receiving base is not required. Moreover, in the configuration where the frame body 2a is arranged outside the peripheral portion of the plate parts 30a, 30b, 30c as shown in FIG. 26, since a concave space can be created inside the frame body 2a, a substrate such as an inverter substrate to be connected to the lamps 4 can be mounted on the frame body 2a apart from the plate bodies 3a, 3b, 3c, and thereby the structure for mounting the substrate can be simplified.

Since the other structures and functions are the same as those in Embodiments 5 and 6, the same codes are used to refer to the same parts and the detailed description thereof is omitted.

Embodiment 8

Figure 28:
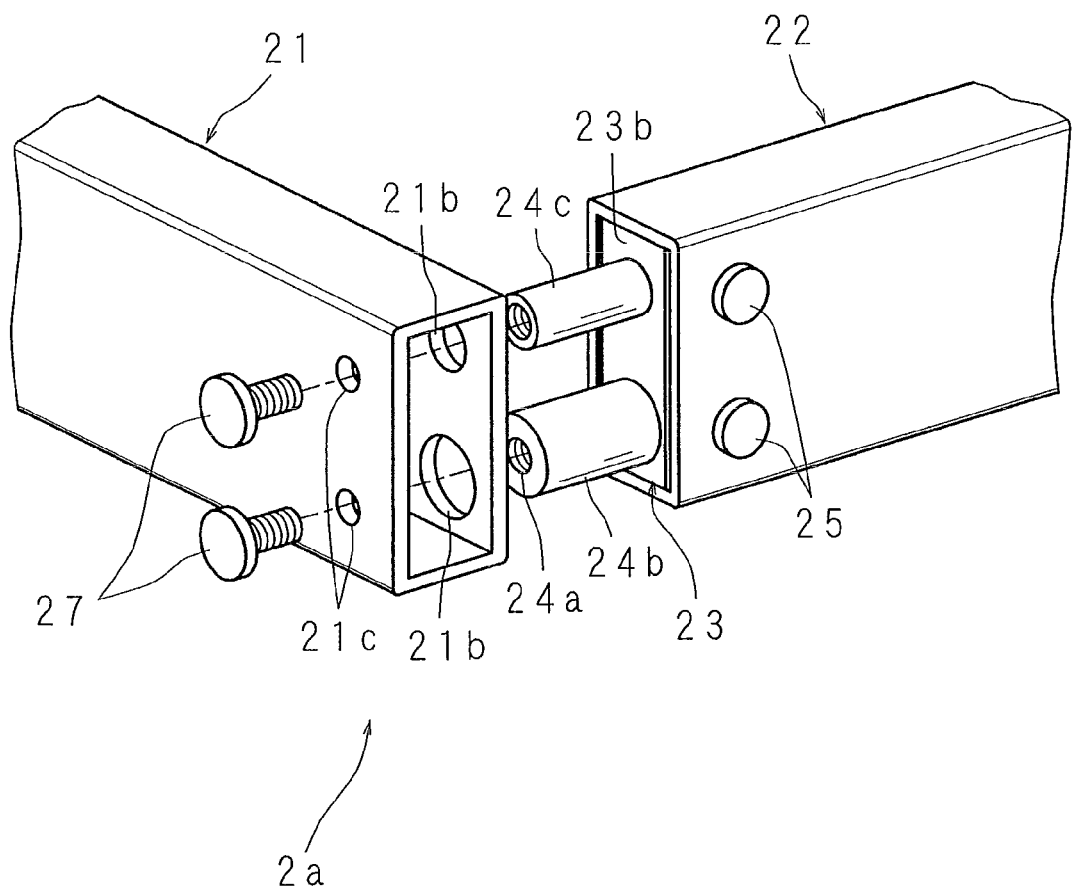
FIG. 28 is an exploded perspective view showing a main part in another configuration of the chassis of the illuminant device according to the present invention.

FIG. 28 is an exploded perspective view showing a main part in another configuration of the chassis E of the illuminant device. In the frame body 2a of the chassis E, instead of making sizes of the two fitting holes 21b, 21b equal to each other and the two fitting shafts 24, 24 equal to each other like Embodiment 5, the two fitting shafts 24, 24 provided in one end part of each of the second rectangular cylindrical bodies 22, 22 and one end part of each of the first rectangular cylindrical bodies 21, 21 have different cross sections in a direction orthogonal to an axial direction of the fitting shafts, in other words, a fitting shaft 24b having a circular cylindrical shape of a larger diameter and a fitting shaft 24c having a circular cylindrical shape of a smaller diameter are juxtaposed. The fitting holes 21b, 21b provided in one end part of each of the first rectangular cylindrical bodies 21, 21 and one end part of each of the second rectangular cylindrical bodies 22, 22 have different diameters corresponding to the diameters of the fitting shafts 24b, 24c, in other words, a fitting hole of the larger diameter and a fitting hole of the smaller diameter are perforated.

In the chassis E constituted in this manner, since the fitting shaft 24b of the larger diameter can be fitted in only the fitting hole of the larger diameter and the fitting shaft 24c of the smaller diameter can be fitted in only the fitting hole of the smaller diameter when the corner portions of four sides are connected to form the frame body 2a, the first and second rectangular cylindrical bodies 21, 22 can be oriented, and the first and second rectangular cylindrical bodies 21, 22 can be arranged correctly at appropriate positions, and thereby improving the assembling workability of the frame body 2a.

Since the other structures and functions are the same as those in Embodiments 5 to 7, the same codes are used to refer to the same parts and the detailed description thereof is omitted.

Embodiment 9

Figure 29:
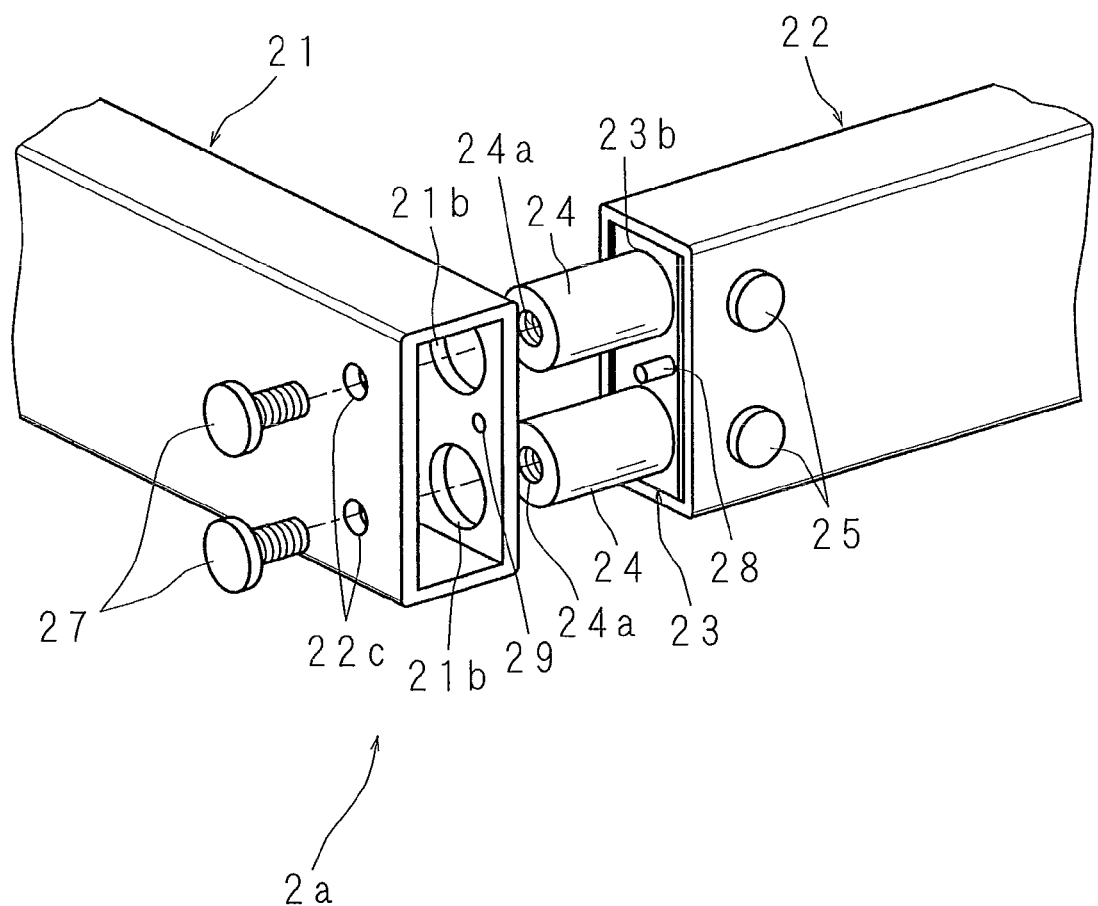
FIG. 29 is an exploded perspective view showing a main part in another configuration of the chassis of the illuminant device according to the present invention.

FIG. 29 is an exploded perspective view showing a main part in another configuration of the chassis E of the illuminant device. The frame body 2a of the chassis E comprises the two fitting holes 21b, 21b and the fitting shafts 24, 24 like Embodiment 5, and in addition, a positioning projecting portion 28 for determining a position of each of the first and second rectangular cylindrical bodies 21, 22 is provided in the outer plate part 23b of the fit-in member 23, and a positioning recess portion 29 in which the positioning projecting portion 28 is to be fitted is provided in the peripheral surface of the one end part of the first rectangular cylindrical body 21 and the peripheral surface of one end part of the second rectangular cylindrical body 22.

The positioning projecting portion 28 projects at a position displaced from the fitting shafts 24, 24, and the positioning recess portion 29 is perforated at a position displaced from the fitting holes 21b, 21b.

In the chassis E constituted in this manner, since the fitting shafts 24, 24 can be fitted in the fitting holes 21b, 21b only in a case where the positioning projecting portion 28 is fitted in the positioning recess portion 29 when the corner portions of four sides are connected to form the frame body 2a, the first and second rectangular cylindrical bodies 21, 22 can be oriented, and the first and second rectangular cylindrical bodies 21, 22 can be arranged correctly at appropriate positions, and thereby improving the assembling workability of the frame body 2a.

Since the other structures and functions are the same as those in Embodiments 5 to 7, the same codes are used to refer to the same parts and the detailed description thereof is omitted.

Here, although the lid plate 3 comprises the first to third juxtaposed plate bodies 31, 32, 33 which are made of aluminum in the chassis B of the embodiments explained above, alternatively, the lid plate 3 may be constructed with a plurality of connected plate bodies whose linear expansion coefficients differ from each other. For example, the first and second plate bodies 31, 32 may be made of aluminum having a linear expansion coefficient of $2.3 \times 10^{-5}$, and the third plate body 33 may be made of an iron plate having a linear expansion coefficient of $1.2 \times 10^{-5}$. At least one of the first to third plate bodies 31, 32, 33 should be made of aluminum, and even in that case, the weight saving of the lid plate 3 can be achieved compared with the lid plate made of an iron plate, the rigidity of the lid plate 3 can be improved, and the weight saving of the chassis B can be achieved even if the illuminant device is comparatively large-sized. Moreover, since the lid plate 3 comprises the plate bodies 31, 32, 33 whose linear expansion coefficients differs from each other and which are connected to each other, the thermal expansion amount of the lid plate 3 can be reduced by use of the plate body with a small linear expansion coefficient, and deflection and deformation of the lid plate 3 by thermal expansion can be prevented. Moreover, the first to third plate bodies 31, 32, 33 may be made of metal plates such as an iron plate, or may be resin molded bodies formed by injection molding or the like. The lid plate 3 constituted in this manner is connected by the connecting unit 7 in the same manner as the lid plate 3 shown in FIGS. 2 to 8.

Here, although in the chassis C in the embodiment explained above comprises the first to third juxtaposed chassis components 8, 9, 10 which are made of aluminum, alternatively, the chassis may comprise a plurality of connected chassis components 8, 9, 10 whose linear expansion coefficients differ from each other. For example, the first and second chassis components 8, 9 may be made of aluminum having a linear expansion coefficient of $2.3 \times 10^{-5}$, and the third chassis component 10 may be made of an iron plate having a linear expansion coefficient of $1.2 \times 10^{-5}$. At least one of the first to third chassis components 8, 9, 10 should be made of aluminum, and in that case, the weight saving thereof can be achieved compared with the chassis made of an iron plate, the rigidity thereof can be improved, and the weight saving of the chassis C can be achieved even if the illuminant device is comparatively large-sized. Moreover, since the chassis C comprises the connected chassis components 8, 9, 10 whose linear expansion coefficients differs from each other, the thermal expansion amount of the chassis C can be reduced by use of the chassis components 8, 9, 10 with a small linear expansion coefficient, and deflection and deformation of the chassis C by thermal expansion can be prevented. Moreover, the first to third chassis components 8, 9, 10 may be made of metal plates such as iron plates, or may be resin molded bodies formed by injection molding or the like. The chassis constituted in this manner is connected by the connecting unit 7 in the same manner as the chassis shown in FIGS. 9 and 10.

Here, although the cylindrical bodies 34 are mounted on the end parts 31c, 32c of the first and second plate bodies 31, 32 by caulking processing in the embodiments described above, alternatively, cylinder parts where the male screws 72 are screwed may be formed as a unit in each of the end parts 31c, 32c of the first and second plate bodies 31, 32 by burring processing.

Here, although the lid plate 3 comprises three sheets of the connected plate bodies 31, 32, 33 in the embodiments described above, alternatively, the lid plate 3 may comprise two sheets of connected plate bodies, or four or more of connected plate bodies.

Here, although the chassis C comprises the three connected chassis components 8, 9, 10 in the embodiment described above, alternatively, the chassis C may comprise two connected chassis components 8, 9 or four or more connected chassis components (chassis components 8, 9 and two or more chassis components 10).

Here, although in the chassis C where the plurality of chassis components 8, 9, 10 are juxtaposed, the adjacent end parts 8a, 10a, 9a, 10b of the plate parts 81, 91,101 of the chassis components 8, 9, 10 are superposed on each other and the connecting unit 7 connects the superposed end parts 8a, 10a, 9a, 10b, alternatively, the chassis may be constructed as follows. The adjacent end parts 8a, 10a, 9a, 10b of the plate parts 81, 91,101 are superposed on each other, the adjacent end parts of the bent pieces 82, 92,102 are superposed on each other, the connecting unit 7 connects the superposed end parts 8a, 10a, 9a, 10b of the plate parts 81, 91,101, and the connecting unit 7 such as the male screws 72 connects the superposed end parts of the bent pieces 82, 92,102. In this configuration, since the plate parts 81, 91,101 are superposed on and connected to each other and the bent pieces 82, 92,102 are superposed on and connected to each other, the rigidity of the chassis C can be improved further. Moreover, the chassis C which comprises the plurality of juxtaposed chassis components 8, 9, 10 may be constructed with a joined structure shown in Embodiments 2 and 3.

Here, although the strip-shaped plates 71 of the connecting unit 7 are bent in the concavo-convex shape in the thickness direction in the embodiments described above, alternatively, the strip-shaped plates 71 may have cross sections of a quadrangular shape, a shape of "E", or a shape of "U".

Here, although the male screws 72 are used as the mounting member of the connecting unit 7, alternatively, headed pins may be used. Each of the headed pins may be fixed to a hole by press fit, or the headed pin may be inserted into the hole and a tip thereof may be fixed by caulking.

Here, although the chassis E is constructed to have the plurality of juxtaposed plate bodies 3a, 3b, 3c mounted to the one frame body 2a in the embodiment described above, alternatively, the chassis E may be constructed to have a plurality of juxtaposed plate bodies 3a, 3b, 3c mounted to a plurality of frame bodies 2a.

Figure 30:
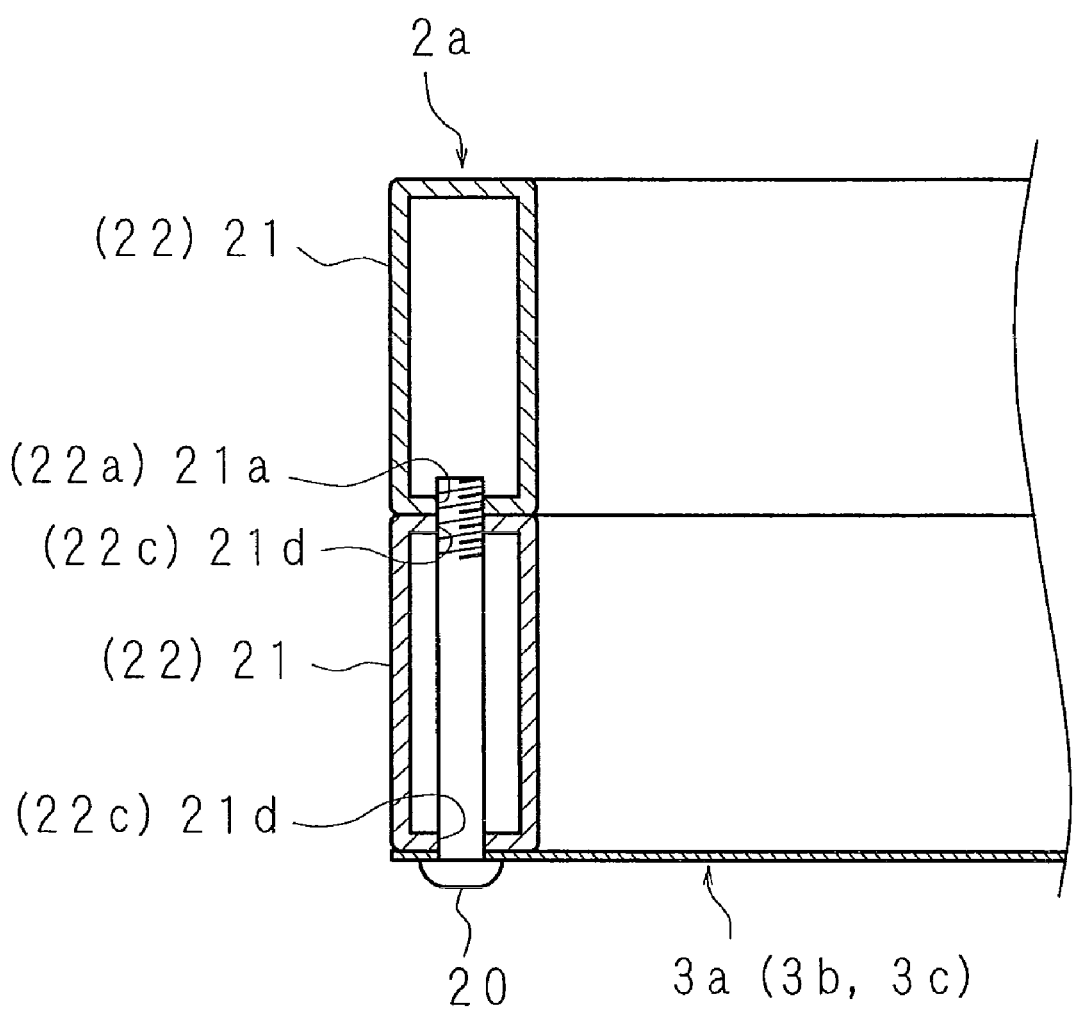
FIG. 30 is a sectional view showing another configuration of the chassis of the illuminant device according to the present invention.

FIG. 30 is a sectional view showing another configuration of the chassis E. In the chassis E, a plurality of the frame bodies 2a are superposed on each other, and the peripheral portion of the juxtaposed plate bodies 3a, 3b, 3c is mounted on the superposed frame bodies 2a, 2a by mounting means such as the male screws 20. The plurality of insertion holes 35b, 36b, 37b are perforated in the peripheral portion of the plate bodies 3a, 3b, 3c, and the screw holes 21a, 22a and the insertion holes 21d, 22c are perforated in the rectangular cylindrical bodies 21, 22 of the frame body 2a, corresponding to the insertion holes 35b, 36b, 37b.

Here, although the opposing edge portions of the plate bodies 3a, 3b, 3c are connected by the connecting members 38 in the embodiments described above, alternatively, the connecting members 38 may be removed. In the configuration where the connecting members 38 are removed, the opposing edge portions of the plate bodies 3a, 3b, 3c may be superposed on each other, and the superposed edge portions may be connected by connecting means such as male screws.

Here, although the chassis E of the embodiment explained above is constructed with three sheets of plate bodies 3a, 3b, 3c mounted in juxtaposition on the frame body 2a, alternatively, the chassis may be constructed with two sheets or four or more sheets of juxtaposed plate bodies 3a, 3b, 3c. Although the plate bodies 3a, 3b, 3c have opposing edge portions of a concavo-convex shape, alternatively, the plate bodies may have linear edge portions, instead of the edge portions of the concavo-convex shape.

Here, although the frame body 2a comprises four frame components arranged in the quadrangular shape in the embodiments described above, alternatively, the frame body 2a may be constructed with two frame components having for example, a shape of an open square bracket, connected in a quadrangular shape, or the frame body may be constructed with five or more frame components connected in a quadrangular shape.

Here, although the frame component comprises four rectangular cylindrical bodies 21, 21, 22, 22 arranged in the quadrangular shape in the embodiments described above, alternatively, the frame component may comprise four circular cylinder bodies or four elliptical cylinder bodies which are arranged in the quadrangular shape. In this case, it is preferred that the end of the cylindrical body having the fitting shafts 24, 24 has a curving surface which curves in an arc shape corresponding to a peripheral surface of the cylindrical body having the fitting holes 21*b*, 21*b*, and thereby the stability of the one cylindrical body having the fitting holes 21*b*, 21*b* with respect to the other cylindrical body is improved.

Here, although the first rectangular cylindrical bodies 21, 21 have the fitting holes 21*b*, 21*b* penetrating the one side surfaces thereof, in the embodiments described above, alternatively, the first rectangular cylindrical bodies 21, 21 may have the fitting holes 21*b*, 21*b* penetrating the both side surfaces thereof, and the fitting shafts 24, 24 may be provided that are fitted in the fitting holes 21*b*, 21*b* of the both side surfaces. Moreover, although the numbers of the fitting holes 21*b* and the fitting shafts 24 are two, respectively, alternatively, the numbers may be three or more, or one, respectively. Moreover, although the fitting holes 21*b* have a round shape and the fitting shafts 24 have a circular cylindrical shape, alternatively, the fitting holes 21*b* may have a square shape, and the fitting shafts 24 may have a rectangular columnar shape.

Here, although the fitting shafts 24, 24 are provided in each of the fit-in members 23 fitted and fixed in the second rectangular cylindrical bodies 22, 22 in the embodiments described above, alternatively, the fitting shafts 24, 24 may be fixed in the second rectangular cylindrical body 22, 22 by press fit, or a plate body may be fixed to opening ends of the second rectangular cylindrical bodies 22, 22, and the fitting shafts 24, 24 may be provided in said plate body. Thus means for providing the fitting shafts 24, 24 in the rectangular cylindrical bodies 21, 22 is not limited in particular. Moreover, although the number of the fitting shafts 24 is two, alternatively, the number may be three or more, or the number may be one.

The illuminant device according to the present invention can be used as a light source of a liquid crystal display device such as a liquid crystal television.

The invention claimed is:

1. An illuminant device, comprising
a chassis for a display which has a frame part and a lid plate closing an opening portion of said frame part and in which a plurality of lamps are arranged,
wherein said lid plate includes a plurality of side-by-side juxtaposed planar plate bodies whose end parts are superposed on each other, and
said superposed end parts have concave parts which are depressed in a direction in which the end parts are superposed, respectively, and the concave parts are fitted in each other while the directions in which the concave parts are depressed coincide with each other.

2. The illuminant device according to claim 1, wherein the superposed end parts have through holes penetrating said concave parts, respectively, and mounting members are fitted in said through holes, respectively.

3. A television apparatus, comprising:
a display unit having a display surface on a front side; and
the illuminant device according to claim 1 arranged behind the display unit.

4. An illuminant device, comprising
a chassis for a display in which a plurality of lamps are arranged,
wherein said chassis includes a plurality of side-by-side juxtaposed planar bodies whose end parts are superposed on each other, and
said superposed end parts have concave parts which are depressed in a direction in which the end parts are superposed, respectively, and the concave parts are fitted in each other while the directions in which the concave parts are depressed coincide with each other.

5. The illuminant device according to claim 4, wherein the superposed end parts have through holes penetrating said concave parts, respectively, and mounting members are fitted in said through holes, respectively.

6. A television apparatus, comprising:
a display unit having a display surface on a front side; and
the illuminant device according to claim 4 arranged behind the display unit.

* * * * *

UNITED STATES PATENT AND TRADEMARK OFFICE
CERTIFICATE OF CORRECTION

| | | |
|---|---|---|
| PATENT NO. | : 8,240,863 B2 | Page 1 of 1 |
| APPLICATION NO. | : 12/664152 | |
| DATED | : August 14, 2012 | |
| INVENTOR(S) | : Hideto Takeuchi et al. | |

It is certified that error appears in the above-identified patent and that said Letters Patent is hereby corrected as shown below:

ON THE TITLE PAGE:

Insert the following:

-- (30)   Foreign Application Priority Data

Jun. 13, 2007   (JP) ............... 2007-156720 --.

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO.        : 8,240,863 B2
APPLICATION NO.   : 12/664152
DATED             : August 14, 2012
INVENTOR(S)       : Hideto Takeuchi et al.

It is certified that error appears in the above-identified patent and that said Letters Patent is hereby corrected as shown below:

ON THE TITLE PAGE:

Insert the following:

-- (30)  Foreign Application Priority Data

Jun. 13, 2007   (JP) ............... 2007-156720
    Aug. 28, 2007   (JP) .............. 2007-221606 --.

This certificate supersedes the Certificate of Correction issued December 18, 2012.

Signed and Sealed this
Fifth Day of March, 2013

Teresa Stanek Rea
*Acting Director of the United States Patent and Trademark Office*